(12) United States Patent
Teixeira Nogueira et al.

(10) Patent No.: US 12,743,621 B2
(45) Date of Patent: Sep. 22, 2026

(54) MODEL UNDERSTANDABILITY

(71) Applicant: Optum, Inc., Minnetonka, MN (US)

(72) Inventors: Joao Gabriel Teixeira Nogueira, County Kildare (IE); Johnathon E. Schultz, Cross Hill, SC (US); Pietro Mascolo, County Dublin (IE); Jason Mcguirk, Dublin (IE)

(73) Assignee: Optum, Inc., Minnetonka, MN (US)

( * ) Notice: Subject to any disclaimer, the term of this patent is extended or adjusted under 35 U.S.C. 154(b) by 670 days.

(21) Appl. No.: 18/298,487

(22) Filed: Apr. 11, 2023

(65) Prior Publication Data

US 2024/0086704 A1 Mar. 14, 2024

Related U.S. Application Data

(60) Provisional application No. 63/375,262, filed on Sep. 12, 2022.

(51) Int. Cl.
*G06N 3/08* (2023.01)
*G06N 3/0442* (2023.01)

(52) U.S. Cl.
CPC ............. *G06N 3/08* (2013.01); *G06N 3/0442* (2023.01)

(58) Field of Classification Search
CPC ...... G06N 3/08; G06N 3/0442; G06N 3/0455; G06N 3/088; G06N 3/09; G06N 5/045; G06N 20/00; G06T 13/40; G06T 13/80; G06V 10/82
See application file for complete search history.

(56) References Cited

U.S. PATENT DOCUMENTS

| | | | |
|---|---|---|---|
| 10,510,022 B1 | 12/2019 | Tharrington, Jr. et al. | |
| 12,387,361 B2 * | 8/2025 | Hanazawa | G06N 3/0464 |
| 2019/0378210 A1 | 12/2019 | Merrill et al. | |
| 2021/0042613 A1 * | 2/2021 | Öztireli | G06N 3/045 |
| 2021/0390457 A1 | 12/2021 | Romanowsky et al. | |

(Continued)

FOREIGN PATENT DOCUMENTS

| | | |
|---|---|---|
| WO | 2021/167998 A1 | 8/2021 |
| WO | 2021/202620 A1 | 10/2021 |

OTHER PUBLICATIONS

"AI DevWorld 2022," Oct. 25-26, 2022, (3 pages), [Retrieved from the Internet Jun. 22, 2023] <https://www.numenta.com/company/events/ai-devworld-2022/>.
"Machine Learning For The Healthcare Industry," Predictive Analytics World For Healthcare, Oct. 7, 2022, (8 pages), [Retrieved from the Internet Jun. 22, 2023] <URL: https://predictiveanalyticsworldhealthcare.eu/>.

(Continued)

*Primary Examiner* — Oluwatosin Alabi
(74) *Attorney, Agent, or Firm* — Alston & Bird LLP

(57) ABSTRACT

Embodiments utilize interpolation to smooth animation frames by generating synthetic Shapley values utilized to generate the animation. Additionally, some embodiments provide for generation of an embedding space for improved understandability of the model training based on corresponding Shapley values. The embedding space is mapped to using activations derived from a specially configured LSTM for each model, where an embedded representation of the LSTM activations is generated by a specially configured autoencoder such that the embedded representation may be mapped to the embedding space. The embedding space and animations are renderable to an interface for user investigation and may be further customizable to narrow investigation on particular data thereof.

20 Claims, 12 Drawing Sheets

(56) References Cited

U.S. PATENT DOCUMENTS

| | | | | |
|---|---|---|---|---|
| 2022/0012613 | A1 | 1/2022 | Datta et al. | |
| 2022/0033897 | A1 | 2/2022 | Zhou et al. | |
| 2022/0122171 | A1 | 4/2022 | Hubard et al. | |
| 2022/0129791 | A1 | 4/2022 | Nia et al. | |
| 2022/0198254 | A1 | 6/2022 | Dalli et al. | |
| 2022/0198562 | A1 | 6/2022 | Cella et al. | |
| 2022/0292308 | A1* | 9/2022 | Schwiep | G06N 20/20 |
| 2022/0330897 | A1 | 10/2022 | Martinot | |
| 2022/0392637 | A1* | 12/2022 | Kollada | G16H 50/30 |
| 2023/0067026 | A1* | 3/2023 | Huts | G06V 20/00 |
| 2025/0044271 | A1* | 2/2025 | Brouwers | G06N 3/084 |

OTHER PUBLICATIONS

Bloch, Louise et al. "Data Analysis With Shapley Values For Automatic Subject Selection In Alzheimer's Disease Data Sets Using Interpretable Machine Learning," Alzheimer's Research & Therapy, vol. 13, No. 155, pp. 1-30, Sep. 15, 2021, DOI: 10.1186/s13195-021-00879-4.

Liu, Xuerui et al. "Axial Compression Prediction and GUI Design For CCFST Column Using Machine Learing and Shapley Additive Explanation," Buildings, vol. 12, No. 698, pp. 1-16, May 23, 2022, DOI: 10.3390/buildings12050698.

Safaei, Nima et al. E-CatBoost: An Efficient Machine Learning Framework For Predicting ICU Mortality Using The eICU Collaborative Research DAtabase, PLoS One, vol. 17, No. 5:e0262895, pp. 1-33, May 5, 2022, DOI: 10.1371/journal.pone.0262895.

* cited by examiner

MODEL UNDERSTANDABILITY

CROSS REFERENCE TO RELATED APPLICATIONS

This application claims priority to U.S. Appl. No. 63/375,262 filed Sep. 22, 2022, the contents of which are hereby incorporated by reference in their entirety.

TECHNICAL FIELD

Embodiments of the present disclosure generally relate to providing understandability of models, such as specially configured machine learning models, and specifically to providing improved understandability of trained models utilizing smooth animation(s) generated based on Shapley values and embedding spaces generated based on the Shapley values.

BACKGROUND

In various contexts, machine learning models are utilized to generate any of a myriad of predictions. Often, such machine learning models are trained for a particular machine learning task. However, during such training, a user often does not have insight into what features and/or learnings a machine learning model has achieved during its training that contributes to the prediction performed by the model.

Applicant has discovered problems and/or inefficiencies with current implementations for providing model explainability. Through applied effort, ingenuity, and innovation, Applicant has solved many of these identified problems by developing solutions embodied in the present disclosure, which are described in detail below.

BRIEF SUMMARY

In one aspect, a computer-implemented method includes training at least one model utilizing a plurality of portions of a training data set, generating a set of Shapley values corresponding to the model, the Shapley values includes a Shapley value generated at completion of training of the model for each different portion of plurality of portions of the training data set, generating a plurality of frames of an animation based on in part on the set of Shapley values, and outputting at least the animation.

In accordance with another aspect of the disclosure, an apparatus is provided. AN example apparatus includes at least one processor and at least one memory, the at least one memory having computer-coded instructions stored thereon that, in execution with the at least one processor, causes the apparatus to perform any one of the example computer-implemented methods described herein.

In accordance with another aspect of the disclosure, a computer program product is provided. An example computer program product includes at least one non-transitory computer-readable storage medium having computer program code stored thereon that, in execution with at least one processor, configures the computer program product for performing any one of the example computer-implemented methods described herein.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
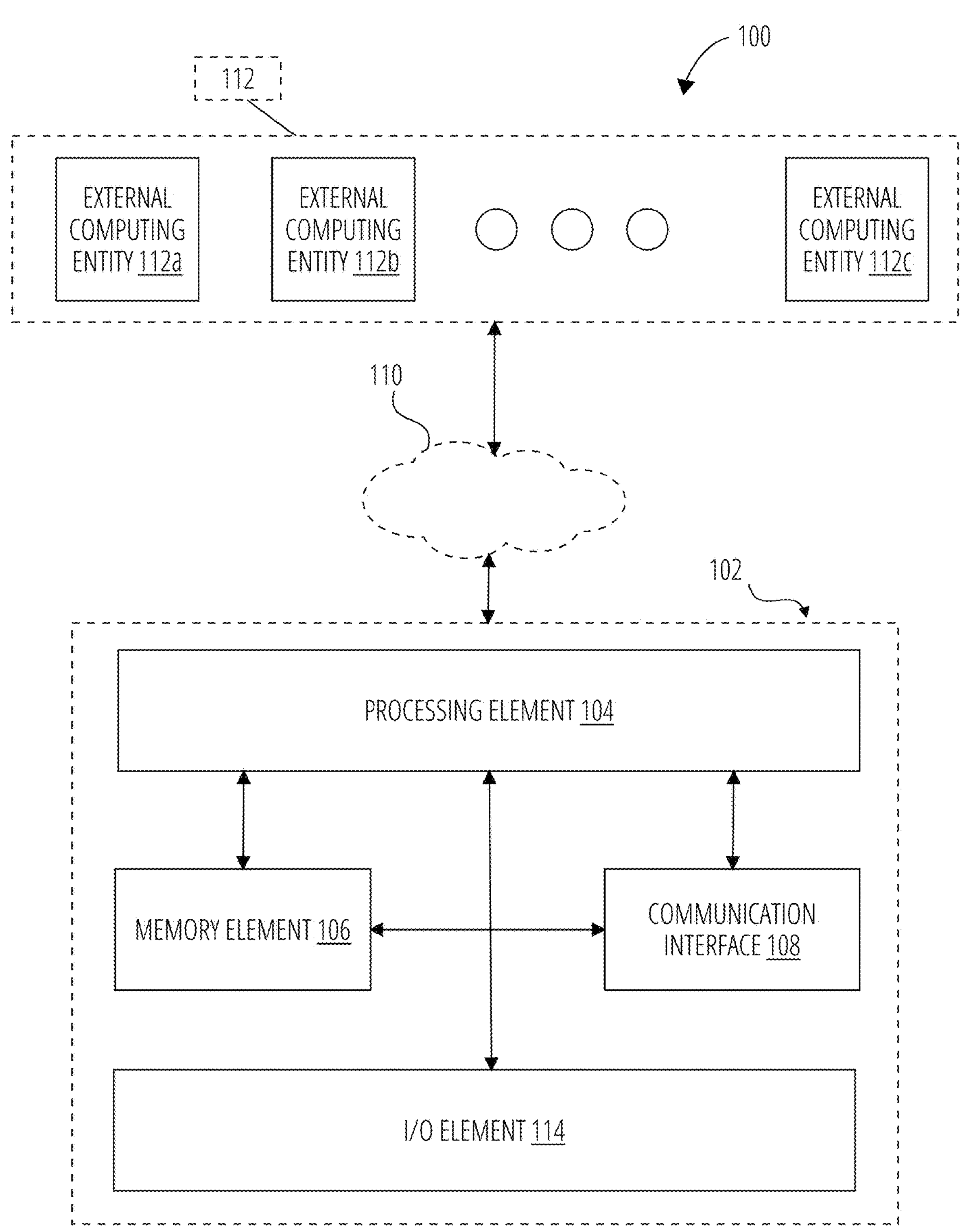
FIG. 1 illustrates an example computing system in accordance with at least one embodiment of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout. Moreover, while certain embodiments of the present disclosure are described with reference to predictive data analysis, one of ordinary skill in the art will recognize that the disclosed concepts may be used to perform other types of data analysis.

Computer Program Products, Methods, and Computing Entities

Embodiments of the present disclosure can be implemented in various ways, including as computer program products that comprise articles of manufacture. Such computer program products can include one or more software components including, for example, software objects, methods, data structures, or the like. A software component can be coded in any of a variety of programming languages. An illustrative programming language can be a lower-level programming language such as an assembly language associated with a particular hardware architecture and/or operating system platform. A software component comprising assembly language instructions can require conversion into executable machine code by an assembler prior to execution by the hardware architecture and/or platform. Another example programming language can be a higher-level programming language that can be portable across multiple architectures. A software component comprising higher-level programming language instructions can require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages can be executed directly by an operating system or other software component without having to be first transformed into another form. A software component can be stored as a file or other data storage construct. Software components of a similar type or functionally related can be stored together such as, for example, in a particular directory, folder, or library. Software components can be static (e.g., pre-established, or fixed) or dynamic (e.g., created or modified at the time of execution).

A computer program product can include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium can include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium can also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium can also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium can also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium can include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media can be substituted for or used in addition to the computer-readable storage media described above.

As should be appreciated, various embodiments of the present disclosure can also be implemented as methods, apparatus, systems, computing devices, computing entities, and/or the like. As such, embodiments of the present disclosure can take the form of an apparatus, system, computing device, computing entity, and/or the like executing instructions stored on a non-transitory computer-readable storage medium to perform certain steps or operations. Thus, embodiments of the present disclosure can also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations can be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a non-transitory computer-readable storage medium for execution. For example, retrieval, loading, and execution of code can be performed sequentially such that one instruction is retrieved, loaded, and executed at a time. In some example embodiments, retrieval, loading, and/or execution can be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Example Framework

FIG. 1 illustrates an example computing system 100 in accordance with one or more embodiments of the present disclosure. The computing system 100 may include a predictive computing entity 102 and/or one or more external computing entities 112*a-c* communicatively coupled to the predictive computing entity 102 using one or more wired and/or wireless communication techniques. The predictive computing entity 102 may be specially configured to perform one or more steps/operations of one or more prediction techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more data objects from and/or to the external computing entities 112*a-c* to perform one or more steps/operations of one or more prediction techniques described herein.

The external computing entities 112*a-c*, for example, may include and/or be associated with one or more data centers. The data centers, for example, may be associated with one or more data repositories storing data that may, in some circumstances, be processed by the predictive computing entity 102 to provide dashboard(s), machine learning analytic(s), and/or the like. By way of example, the external computing entities 112*a-c* may be associated with a plurality of entities. A first example external computing entity 112*a*, for example, may host a registry for the entities. By way of example, in some example embodiments, the entities may include one or more service providers and the external computing entity 112*a* may host a registry (e.g., the national provider identifier registry, and/or the like) including one or more clinical profiles for the service providers. Additionally or alternatively, in some embodiments, the external computing entity 112*a* may include service provider data indicative of medical encounters serviced by the service provider, for example including patient data, CPT and/or diagnosis data, and/or the like. In addition, or alternatively, a second example external computing entity 112*b* may include one or more claim processing entities that may receive, store, and/or have access to a historical interaction data set for the entities. In this regard, the external computing entity 112*b* may include such patient data, CPT and/or diagnosis data, claims data, other code data, and/or the like for any of a number of medical encounters. In some embodiments, the external computing entity 112*b* embodies one or more computing system(s) that support operations of an insurance or other healthcare-related entity. In some embodiments, a third example external computing entity 112*c* may include a data processing entity that may preprocess the historical interaction data set to generate one or more data objects descriptive of one or more aspects of the historical interaction data set. Additionally or alternatively, in some embodiments, the external computing entities includes an external computing entity embodying a central data warehouse associated with one or more other external computing entities, for example where the central data warehouse aggregates data across a myriad of other data sources. Additionally or alternatively, in some embodiments, the external computing entities includes an external computing entity embodying a user device or system that collect(s) user health and/or biometric data.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like may be used to control certain aspects of the operation of the predictive computing entity 102 with the assistance of the processing element 104.

As indicated, in one embodiment, the predictive computing entity 102 may also include one or more communication interfaces 108 for communicating with various computing entities such as the external computing entities 112*a-c*, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
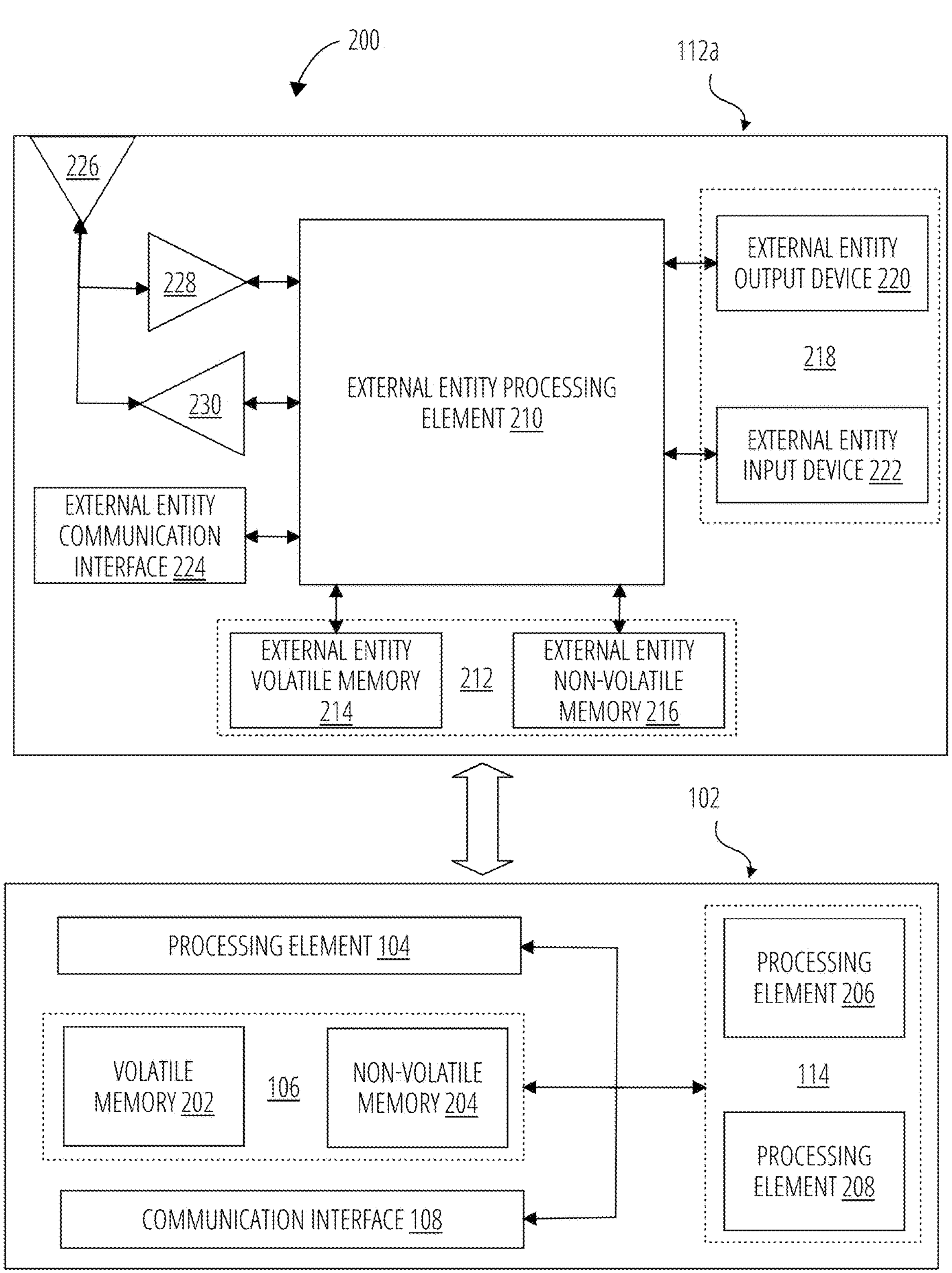
FIG. 2 illustrates a schematic diagram showing a system computing architecture in accordance with at least one embodiment of the present disclosure.

FIG. 2 is a schematic diagram showing a system computing architecture 200 in accordance with some embodiments discussed herein. In some embodiments, the system computing architecture 200 may include the predictive computing entity 102 and/or the external computing entity 112*a* of the computing system 100. The predictive computing entity 102 and/or the external computing entity 112*a* may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry such as a communication bus, and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The memory element 106 may include non-volatile memory 204 (also referred to as non-volatile storage, memory, memory storage, memory circuitry and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Implementations of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as in a particular directory, folder, or library. Software components may be static (e.g., pre-established, or fixed) or dynamic (e.g., created, or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112*a*. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112*a* may include an external entity processing element 210, an external entity memory element 212, an external entity communication interface 224, and/or one or more external entity I/O elements 218 that communicate within the external computing entity 112*a* via internal communication circuitry such as a communication bus, and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112*a* may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112*a* may be capable of operating with one or more air interface standards, communication protocols, modulation types, and access types. More particularly, the external computing entity 112*a* may operate in accordance with any of a number of wireless communication standards and protocols, such as those described above with regard to the predictive computing entity 102.

Via these communication standards and protocols, the external computing entity 112*a* may communicate with various other entities using means such as Unstructured Supplementary Service Data (USSD), Short Message Service (SMS), Multimedia Messaging Service (MMS), Dual- Tone Multi-Frequency Signaling (DTMF), and/or Subscriber Identity Module Dialer (SIM dialer). The external computing entity 112*a* may also download changes, add-ons, and updates, for instance, to its firmware, software (e.g., including executable instructions, applications, program modules), operating system, and/or the like.

According to one embodiment, the external computing entity 112*a* may include location determining embodiments, devices, modules, functionalities, and/or the like. For example, the external computing entity 112*a* may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112*a* in connection with a variety of other systems, including cellular towers, Wi-Fi access points, and/or the like. Similarly, the external computing entity 112*a* may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112*a* to interact with and/or cause the display, announcement, and/or the like of information/data to a user. The user input interface may include any of a number of input devices or interfaces allowing the external computing entity 112*a* to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112*a* and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

Examples of Certain Terms

"Animation" may refer to any sequence of images depicted across a timeseries. Non-limiting examples of an animation includes a video, a GIF, and a playable image sequence.

"Completion of training" may refer to a timestamp at which a model is trained based on each record in a particular portion of training data set.

"Embedded representation" may refer to a representation of particular data that embodies the particular data in an embedding space, where the embedded representation represents the data with reduced dimensionality.

"Embedding space" may refer to a low-dimensional vector space in which embedded representations of higher-dimensional data is projected.

"Encoded activations representation" may refer to an embedded representation of LSTM activations for a particular LSTM model corresponding to a particular model type. In some embodiments, an encoded activations representation is embodied in a two-dimensional vector space.

"Highlight criteria" may refer to data value(s) corresponding to a particular data value or data property that is utilized to select particular embedded representation(s) from an embedding space or filter particular embedded representation(s) from an embedding space.

"LSTM activations" may refer to the activations performed at each layer of an LSTM model.

"LSTM model" may refer to a long short-term memory network.

"Model" may refer to a statistical, algorithmic, and/or machine learning model that is specially trained to achieve a particular learning task based on data patterns, insights, and/or other derivations from training data processed by the model.

"Model type" may refer to electronically managed data that represents a classification or algorithm that a model utilizes to learn from a particular training data set.

"Plot representation" may refer to a graphical representation of data value(s) that is renderable to an interface.

"Plot type" may refer to a particular arrangement for depicting data in a plot representation.

"Set" may refer to one or more data structure(s) that stores any number of a particular data value(s) in an arranged or unarranged order. Non-limiting examples of a set include a vector, an array, a list, and a set data structure.

"Set of LSTM activations" may refer to one or more data structure(s) that store any number of LSTM activations.

"Set of Shapley values" may refer to one or more data structure(s) that store any number of Shapley values.

It will be appreciated that the term "Shapley value" may refer to both conventional Shapley values as well as any other machine learning model explainability metric value. The terms "shap value" and "SHAP value" refer to any Shapley value.

"Synthetic Shapley value" may refer to a Shapley value generated via interpolation between two other Shapley values.

"User engagement" may refer to any user input, interaction, or signal representing interaction with a particular interface.

Technical Problems and Technical Solutions

In various contexts, a user utilizes machine learning model(s) for any of a myriad of purposes. Often, however, a user does not visibility into the functioning of the machine learning model. Particularly, as a machine learning model is trained, the model often learns data trend(s) and/or insight(s) that may not be known, expected, or even understood by the user. The contribution of particular features to the final determination of the user may be unknown to the user, such that explaining the functionality of the model is not possible by the end user. Additionally, as the model learns, changes in the model's reliance on particular feature(s) and/or the like may not be known to the user, such that the reliability and stability of the model may not be determinable even when insight associated with the end model as trained may be identified.

Existing attempts to explain model functionality remain insufficient in these aspects. For example, Shapley values may be determined for a model when training is completed. In such circumstances, however, the Shapley values do not provide sufficient insight into model robustness, learnings of the model over time, and/or the like. In this regard, using conventional explainability mechanism(s) on their own, a user may still be left without the ability to garner particular desirable insights with respect to operation of a model. For example, using Shapley values alone, a user may not be provided any insight into how trustable explanation(s) provided by such Shapley explanation(s).

Embodiments of the present disclosure provide for improved data insight(s) and interface(s) associated therewith. In some embodiments, particular explainability metric values are determined for a model during different training phases as the model is trained utilizing different portions including different amounts of a particular data set. Some embodiments provide animations of model learnings as such training occurs, for example, based on explainability metric values (e.g., Shapley values) associated with each training phase. In this regard, one or more animation(s) depicting plot(s) of the explainability metric value(s) may be generated and provided via one or more interface(s), for example where the animation(s) provide enhanced explainability into the trustworthiness of such model(s) based on the learning mechanism of such model(s) as depicted in the animation. In some embodiments, one or more synthetic explainability metric value(s), for example synthetic Shapley values, is/are generated to smooth the animation for visual playback.

Some embodiments provide for further improved data insight(s) based on embedding of particular data associated with one or more model(s). In some such embodiments, a specially trained LSTM model is provided to determine LSTM activations based on Shapley values derived from multi-stage training of a particular model. The LSTM activations are utilized to derive an encoded activations representation corresponding to the model. In this regard, an embedding space may be mapped based on various encoded plot representations of various models, such that the embedding space is usable to identify similarities between model(s) based on one or more characteristics by proximity of corresponding embedded representations in the embedding space. In some embodiments, the embedding space is renderable to an interface to viewing and/or interpretation by a user to provide further model explainability. Some embodiments generate an animation of mappings to an embedding space, such that algorithm/model decision-making similarity across time may be achieved based on proximity within the embedding space between embedded representations of models, and/or mislabeled predictions at a given point in time may be corrected by an end user.

Embodiments of the present disclosure provide improved model explainability associated with particular model(s). Particularly, embodiments of the present disclosure provide for improved data insight(s) and dashboard interface(s) that allow a user to validate explanations of a particular model's functionality and further validate the stability and trustworthiness of the model. For example, via such animations a user, developer, or the like may determine whether a particular model is constantly and significantly updating the importance of particular features in performing its determination, or whether a particular model is trained in a manner that remains consistently and robustly narrowing in on emphasizing importance of particular features as training continues. Further, by leveraging embedded representations of such models, embodiments of the present disclosure provide additional insights that are not capturable by conventional explainability mechanisms. In this regard, embodiments provide enhanced explainability of model effectiveness and stability across time by visualizing the training of the model across time, as well as derivations of related models based on the visualization in the embedding, and/or enable a user to analyze the animations and embedding space to derive improved insights that are not offered with conventional explainability alone.

Example Data Manipulations for Improved Animation Generation

Having described example systems and apparatuses in accordance with the disclosure, example data environments and data manipulations for improved animation generation will now be discussed. In some embodiments, the data environments as depicted are maintained as a software environment maintained via particular hardware and/or firmware of a particular system, device, and/or apparatus as described herein. For example, in some embodiments, the predictive computing entity 102 maintains one or more software environment(s) that enable maintenance of the data architecture as described herein, and/or performance of the data manipulations as described herein.

Figure 3:
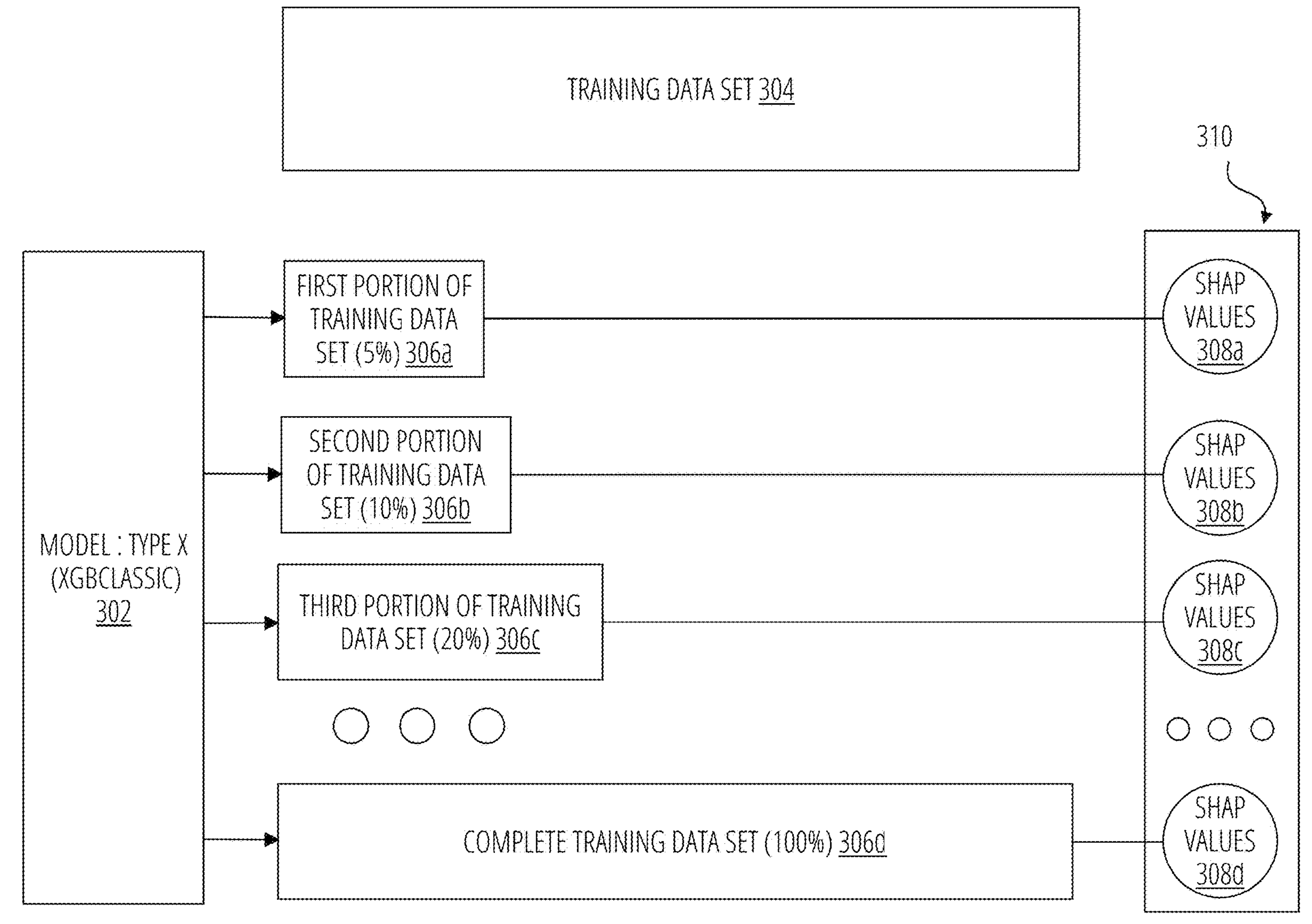
FIG. 3 illustrates a visualization of an example data process for training a model utilizing a plurality of portions of a training data set in accordance with at least one embodiment of the present disclosure.

FIG. 3 illustrates a visualization of an example data process for training a model utilizing a plurality of portions of a training data set in accordance with at least one embodiment of the present disclosure. Specifically, FIG. 3 depicts generation of a set of Shapley values embodied by a SHAP vector 310 from a plurality of training phases associated with a particular model, specifically model 302, and particular training data set, specifically training data set 304. In some embodiments, the predictive computing entity 102 maintains the training data set 304. In other embodiments, the predictive computing entity 102 receives the training data set 304, for example via user engagement or by retrieving the training data set 304 in response to user engagement selecting a particular training data set 304.

In some embodiments, the model 302 is associated with a particular model type. In some embodiments, the predictive computing entity 102 automatically identifies a model, such as the model 302, for training. Alternatively or additionally in some embodiments, the model 302 is selected based on in part on user selection and/or user engagement. For example, in some embodiments, a user selects a particular model type for training from a plurality of different model types. In some embodiments, one or more predetermined model type(s) is/are trained.

In some embodiments, the model is trained via different training phases. Each training phase consists of training a model, specifically the model 302, with a different portion of the training data set 304, each portion including a different percentage split of the complete set of records in the training data set 304. In some embodiments, each training phase builds on the previous phase, such that the percentage split of the training data set utilized at each training phase increases at each training phase. In some embodiments, the training data set 304 includes a subset of a data set split into a training data set and a test data set, and/or a training data set, a test data set, and a validation data set.

In some embodiments, the model 302 is trained on a first portion of training data set 306*a* including 5% of the complete training data set represented by the training data set 304. Such training of the model 302 embodies a first training phase based on in part on the first portion of training data set 306*a*. Upon completion of the training, the predictive computing entity 102 may determine a first set of Shapley values embodied by SHAP values 308*a*. The SHAP values 308*a* in some embodiments includes a vector of Shapley values for one or more features. The predictive computing entity 102 in some embodiments generates the SHAP values 308*a* utilizing any one or more procedure(s), algorithm(s), and/or the like of one or more known Shapley library implementation(s). In this regard, the SHAP values 308*a* in some embodiments represents a vector of Shapley values, where each Shapley value corresponds to a particular feature and represents the contribution of that feature towards a prediction performed by the model 302 upon completion of the first training phase utilizing the first portion of training data set 306*a*.

In some embodiments, the predictive computing entity 102 continues processing the training data set 304 for any number of training phases. For example, in some embodiments, the predictive computing entity 102 trains the model 302 via one or more additional phase(s). As illustrated, the model 302 is trained in a second training phase utilizing a second portion of training data set 306*b*, specifically including 10% of the training data set 304. Such training of the model 302 embodies a second training phase based on in part on the second portion of training data set 306*b*. Similarly to the first training phase, upon completion of the training, the predictive computing entity 102 may determine a second set of Shapley values embodied by the SHAP values 308*b*. The SHAP values 308*b* in some embodiments includes a vector of Shapley values for the model features having values updated to reflect the updated learnings of the model 302 derived from the second portion of training data set 306*b*. Further, the predictive computing entity 102 trains the model 302 in a third training phase utilizing a third portion of training data set 306*c*, specifically including 20% of the training data set 304. Such training of the model embodies a third training phase based on in part on the third portion of training data set 306*c*, and upon completion of the training the predictive computing entity 102 may determine a third set of Shapley values embodied by the SHAP values 308*c*. The SHAP values 308*c* similarly reflect the updated learnings of the model 302 derived from the third portion of training data set 306*c*.

In some embodiments, such training phases may continue for any number of percentage splits of the training data set 304 until a final phase is reached. Specifically, as illustrated for example, the model 302 is trained in a final training phase that utilizes the complete training data set 306*d* including 100% of the training data set 304. Similarly, upon completion of the final training phase, the predictive computing entity 102 determines a final set of Shapley values embodied by the SHAP values 308*d*.

In some embodiments, each of the set of Shapley values corresponding to a particular training phase is maintained separately. Additionally or alternatively, in some embodiments, the predictive computing entity 102 maintains the set of Shapley values in one or more data structure(s). For example, as illustrated, the predictive computing entity 102 in some embodiments maintains a SHAP vector 310, where the SHAP vector 310 includes a subset embodying the set of Shapley values determined for each training phase. In some embodiments, the predictive computing entity 102 maintains the SHAP vector 310 in a particular arrangement or order, for example where the subsets embodying SHAP values 308*a*-308*d* are maintained in the order in which the training phases occurred (e.g., SHAP values 308*a* first, SHAP values 308*b* second, and so on). In this regard, the SHAP vector 310 embodies a set of Shapley values including the Shapley values corresponding to each training phase for the model 302. In this regard, in some embodiments a set of Shapley values may include sub-sets (e.g., sub-vectors or the like) of any number of Shapley values corresponding to a particular training phase of number of training phases.

Once all such training phases are completed and the Shapley values for each training phase is created, such Shapley values may be provided for further processing. For example, in some embodiments, the Shapley values of the SHAP vector 310 are further processed to update the SHAP vector 310 with one or more synthetic Shapley values as described further herein. In some embodiments, the Shapley values of the SHAP vector 310 are further processed to generate one or more animations as described further herein. Additionally or alternatively, in some embodiments the Shapley values of the SHAP vector 310 are further processed to update an embedding space as described herein.

Figure 4:
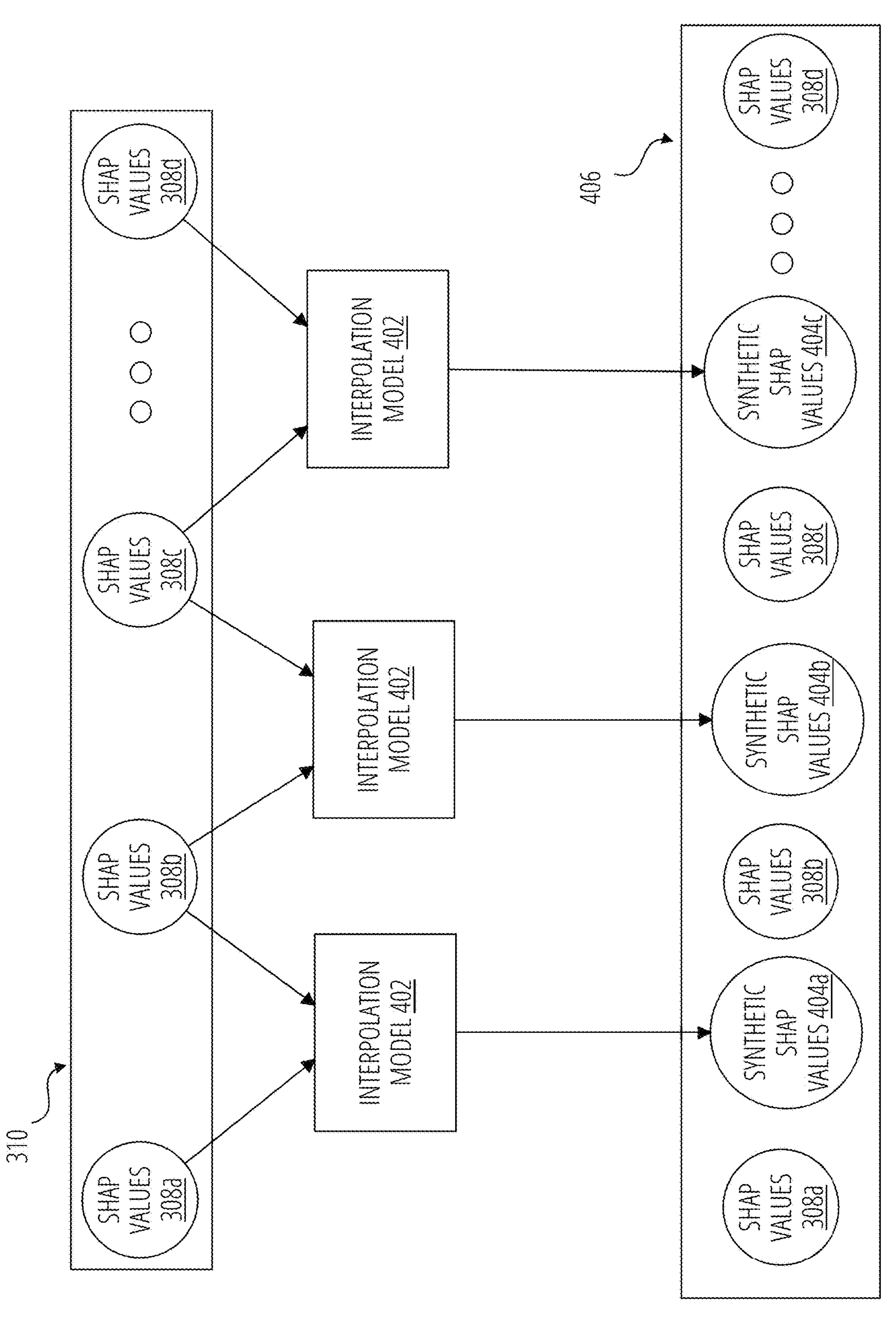
FIG. 4 illustrates a visualization of an example process for generation of synthetic Shapley values in accordance with at least one embodiment of the present disclosure.

FIG. 4 illustrates a visualization of an example process for generation of synthetic Shapley values in accordance with at least one embodiment of the present disclosure. Specifically, FIG. 4 depicts generation of an example updated SHAP vector 406 representing an updated set of Shapley values based on in part on a starting set of Shapley values embodied by the SHAP vector 310. It should be appreciated that the SHAP vector 310 may be generated as depicted and described with respect to FIG. 3. Additionally or alternatively, in some embodiments, the SHAP vector 310 is received from another system, device, and/or the like.

In some embodiments, the predictive computing entity 102 generates one or more synthetic Shapley values that supplement the real Shapley values of the SHAP vector 310 generated via one or more training phases. In some such embodiments, the synthetic Shapley values are generated to provide intermediary Shapley values between the training phases that are usable to more smoothly transition between frames of an animation. In this regard, it will be appreciated that the execution time required to generate the synthetic Shapley values as described herein is significantly reduced as compared to performing additional intermediary training phases and generating Shapley values associated with such training phases.

In some embodiments, the predictive computing entity 102 generates one or more sets of synthetic Shapley values between each set of Shapley values generated corresponding to a performed training phase. For example, in some embodiments, the predictive computing entity 102 generates first synthetic Shapley values for inclusion between the SHAP values 308*a* corresponding to the first training phase and the SHAP values 308*b* corresponding to the second training phase, second synthetic Shapley values for inclusion between the SHAP values 308*b* corresponding to the second training phase and the SHAP values 308*c* corresponding to the third training phase, and so on. In some embodiments, each set of synthetic Shapley values generated includes a synthetic Shapley value corresponding to each feature in both sets of Shapley values utilized to generate such synthetic Shapley values.

In some embodiments, the predictive computing entity 102 generates synthetic Shapley values utilizing one or more interpolation models. For example as illustrated, in some embodiments the predictive computing entity 102 generates synthetic Shapley values utilizing a particular interpolation model 402. In some embodiments, the interpolation model 402 embodies a specially configured linear interpolation model that linearly interpolates between a first value represented in a first set of Shapley values and a second value represented in a second set of Shapley values. It will be appreciated that in other embodiments, another type of interpolation model may be utilized.

In some embodiments, the predictive computing entity 102 generates at least synthetic SHAP values 404*a*, synthetic SHAP values 404*b*, and synthetic SHAP values 404*c*. Each of such synthetic Shapley values are generated by at least applying a first and second subsequent set of Shapley values to the interpolation model 402, for example SHAP values 308*a* and SHAP values 308*b* to generate the synthetic SHAP values 404*a*, SHAP values 308*b* and SHAP values 308*c* to generate the synthetic SHAP values 404*b*, and SHAP values 308*c* and SHAP values 308*d* to generate the synthetic SHAP values 404*c*.

In some embodiments, the resulting generated synthetic Shapley values are subsequently utilized to update the SHAP vector 310. In some embodiments, as illustrated, each set of synthetic Shapley values is added to the SHAP vector 310 between the set of Shapley values utilized to generate such synthetic Shapley values. For example, synthetic SHAP values 404*a* is positioned in the set between SHAP values 308*a* and SHAP values 308*b* that were utilized to generate the synthetic SHAP values 404*a*, synthetic SHAP values 404*b* is positioned in the set between SHAP values 308*b* and SHAP values 308*c* that were utilized to generate the synthetic SHAP values 404*b*, and synthetic SHAP values 404*c* is positioned in the set between SHAP values 308*c* and SHAP values 308*d* that were utilized to generate the synthetic SHAP values 404*c*. In this regard, the synthetic Shapley values are utilized to update the SHAP vector 310 to an updated set of Shapley values that includes the generated synthetic Shapley values, for example depicted as updated SHAP vector 406.

It should be appreciated that the generated synthetic Shapley values may include any number of iterations of intermediary synthetic Shapley values. For example, in some embodiments, the interpolation model 402 generates a particular number of intermediary iterations of synthetic Shapley value corresponding to a particular data property having a Shapley value in the Shapley values from which the synthetic Shapley value is generated (e.g., a feature). In some embodiments, the interpolation model 402 generates a predetermined number of intermediary synthetic Shapley values (e.g., 100 synthetic Shapley values). In other embodiments, the interpolation model 402 generates a dynamic number of intermediary synthetic Shapley values, for example algorithmically determined based on in part on the increment between percentages of the training data set utilized during the generation of the initial set of Shapley values. For example, the synthetic Shapley values may include a synthetic Shapley value corresponding to one or more features represented in each actual set of Shapley values corresponding to a first training phase and a second training phase, where the synthetic Shapley values form intermediary sets of Shapley values corresponding to synthetic intermediary training phases (e.g., that were not actually performed) between actual training phases (e.g., that were performed and for which Shapley values were determined). In this regard, each of the synthetic SHAP values 404*a*, synthetic SHAP values 404*b*, and synthetic SHAP values 404*c* may include any number of subsets of synthetic Shapley values. For example, in some embodiments, the interpolation model 402 generates 100 intermediary synthetic Shapley values for each feature represented in the two input set of Shapley values, such that the synthetic SHAP values 404*a* (for example) is generated to include 100 sub-vectors of synthetic Shapley values generated from the SHAP values 308*a* and SHAP values 308*b*, where the synthetic SHAP values 404*a* includes a sub-vector including each synthetic Shapley value for each feature at each iteration of the 100 iterations. In this regard, it should be appreciated that any of the synthetic SHAP values 404*a*, 404*b*, and/or 404*c* may embody or include a set of individual vectors (or other subsets) including synthetic Shapley values for a particular synthetically generated iteration.

In some embodiments, the Shapley values of the updated SHAP vector 406 are further processed to generate one or more animations as described further herein. Additionally or alternatively, in some embodiments the Shapley values of the updated SHAP vector 406 are further processed to update an embedding space as described herein.

Figure 5:
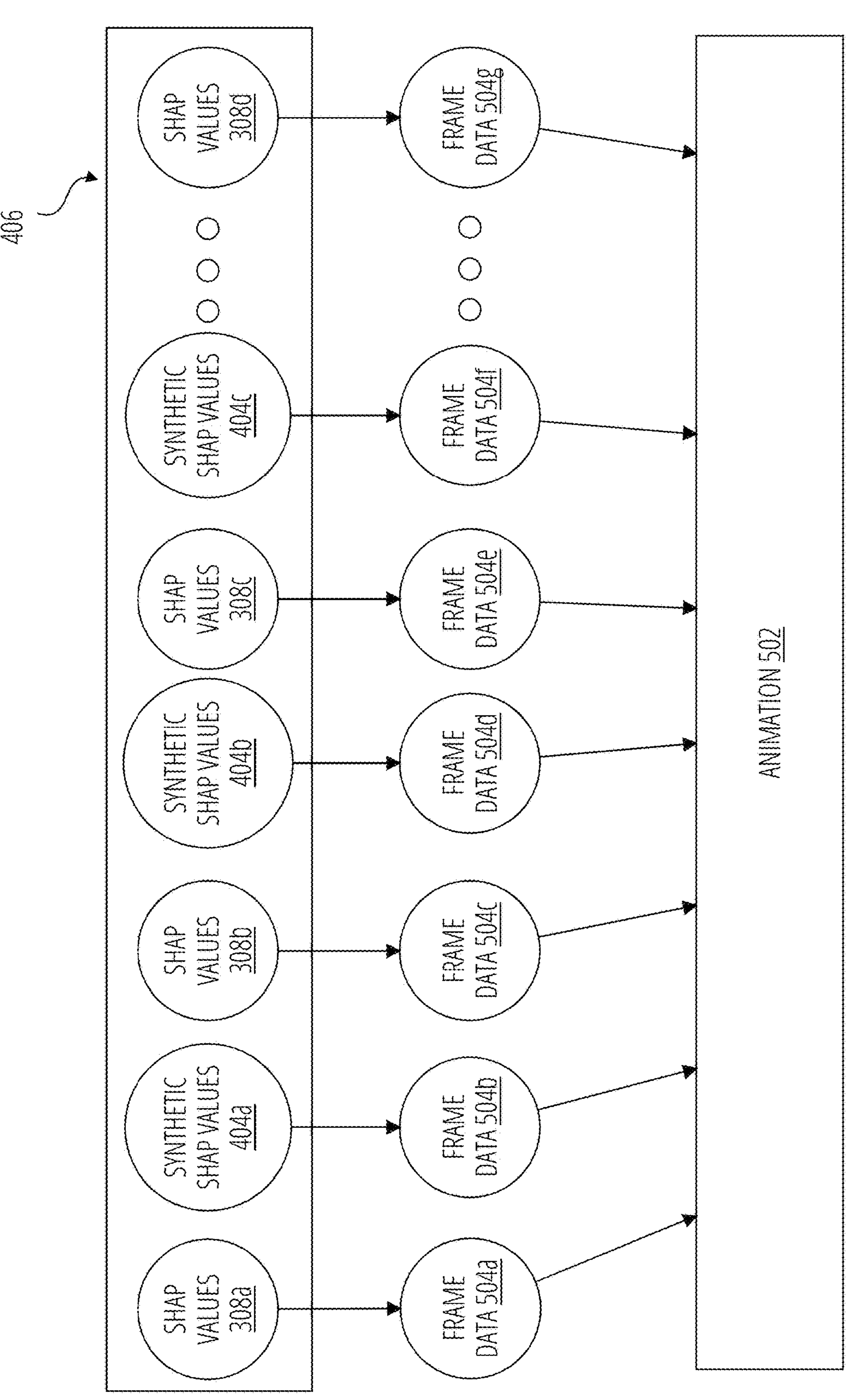
FIG. 5 illustrates a visualization of an example process for generation of an animation from a set of Shapley values in accordance with at least one embodiment of the present disclosure.

FIG. 5 illustrates a visualization of an example process for generation of an animation from a set of Shapley values in accordance with at least one embodiment of the present disclosure. Specifically, FIG. 5 depicts a visualization of generation of an animation 502 from an updated SHAP vector 406. As depicted, the synthetic Shapley values of the updated SHAP vector 406 may be utilized to generate additional frames that smooth the resulting animation. It will be appreciated that, in other embodiments, an example animation is generated utilizing a set of Shapley values that does not include one or more generated synthetic Shapley values.

In some embodiments, each portion of Shapley values of the updated SHAP vector 406 is utilized to generate particular frame data. Specifically, as illustrated, SHAP values 308*a* is utilized to generate frame data 504*a*, synthetic SHAP values 404*a* is utilized to generate frame data 504*b*, SHAP values 308*b* is utilized to generate frame data 504*c*, synthetic SHAP values 404*b* is utilized to generate frame data 504*d*, SHAP values 308*c* is utilized to generate frame data 504*e*, synthetic SHAP values 404*c* is utilized to generate frame data 504*f*, and SHAP values 308*d* is utilized to generate frame data 504*g*.

In some embodiments, a portion of frame data defines one or more frames. For example, in some embodiments, a portion of frame data includes a frame corresponding to each subset of Shapley values from which the frame data is derived. In this regard, a set of Shapley values including a single set (e.g., as generated based on a performed training phase, such as SHAP values 308*a*, SHAP values 308*b*, SHAP values 308*c*, and SHAP values 308*d*) may be utilized to generate a single corresponding frame. Additionally, each other subset of Shapley values (including synthetic Shapley values) may similarly correspond to a single frame. In this regard, the synthetic SHAP values 404*a*, synthetic SHAP values 404*b*, and/or synthetic SHAP values 404*c* may include a plurality of subsets, each including a different set of synthetic Shapley values, and may thus correspond to a portion of frame data defining a plurality of frames. For example, in the context where 100 intermediary synthetic Shapley values are generated for each feature during generation of the synthetic SHAP values 404*a*, as described with respect to FIG. 4 for example, the synthetic SHAP values 404*a* may be utilized to derive frame data 504*b* representing 100 frames (e.g., one frame per subset of synthetic Shapley values in the synthetic SHAP values 404*a*).

In some embodiments, a frame represents a visual depiction of the particular data values in at least a portion of the frame data. For example, the frame data 504*a* may define a single frame that depicts a particular plot representation of a particular plot type depicting the numerical values for each feature represented in the SHAP values 308*a*. Similarly, the frame data 504*b* may define any number of frames, each that depict a particular plot representation of the particular plot type depicting the numerical values for each feature represented in the synthetic SHAP values 404*a* (e.g., in embodiments where the synthetic SHAP values 404*a* includes only a single set of synthetic Shapley values) or a particular subset of the synthetic SHAP values 404*a* (e.g., in embodiments where the synthetic SHAP values 404*a* includes a plurality of subsets of synthetic Shapley values). It should be appreciated that this process may be performed to generate frame data comprising one or more frames from each portion of Shapley values in the updated SHAP vector 406.

In some embodiments, the predictive computing entity 102 generates the animation 502 from the various portions of frame data, for example frame data 504*a*-504*g*. For example, in some embodiments, the predictive computing entity 102 generates the animation 502 by arranging the frames represented in the frame data 504*a*-504*g* in order. In some such embodiments, the frames are arranged in the same order as the arrangements of the subsets of Shapley values in the updated SHAP vector 406. In this regard, the arrangement of data and corresponding frames may be maintained. Similarly, in some embodiments, this order matches the iterations of training phases performed for different percentage split portions of a training data set, together with any frames generated from synthetic Shapley values derived therefrom. By arranging the frames into the animation 502, the resulting animation 502 provides a visible and smooth presentation of the learning of the model across the training phases, which may be analyzed by an end user to gain further insights into the operations, effectiveness, robustness, or trustworthiness of the model.

Example Animation Interfaces of the Disclosure

Figure 6:
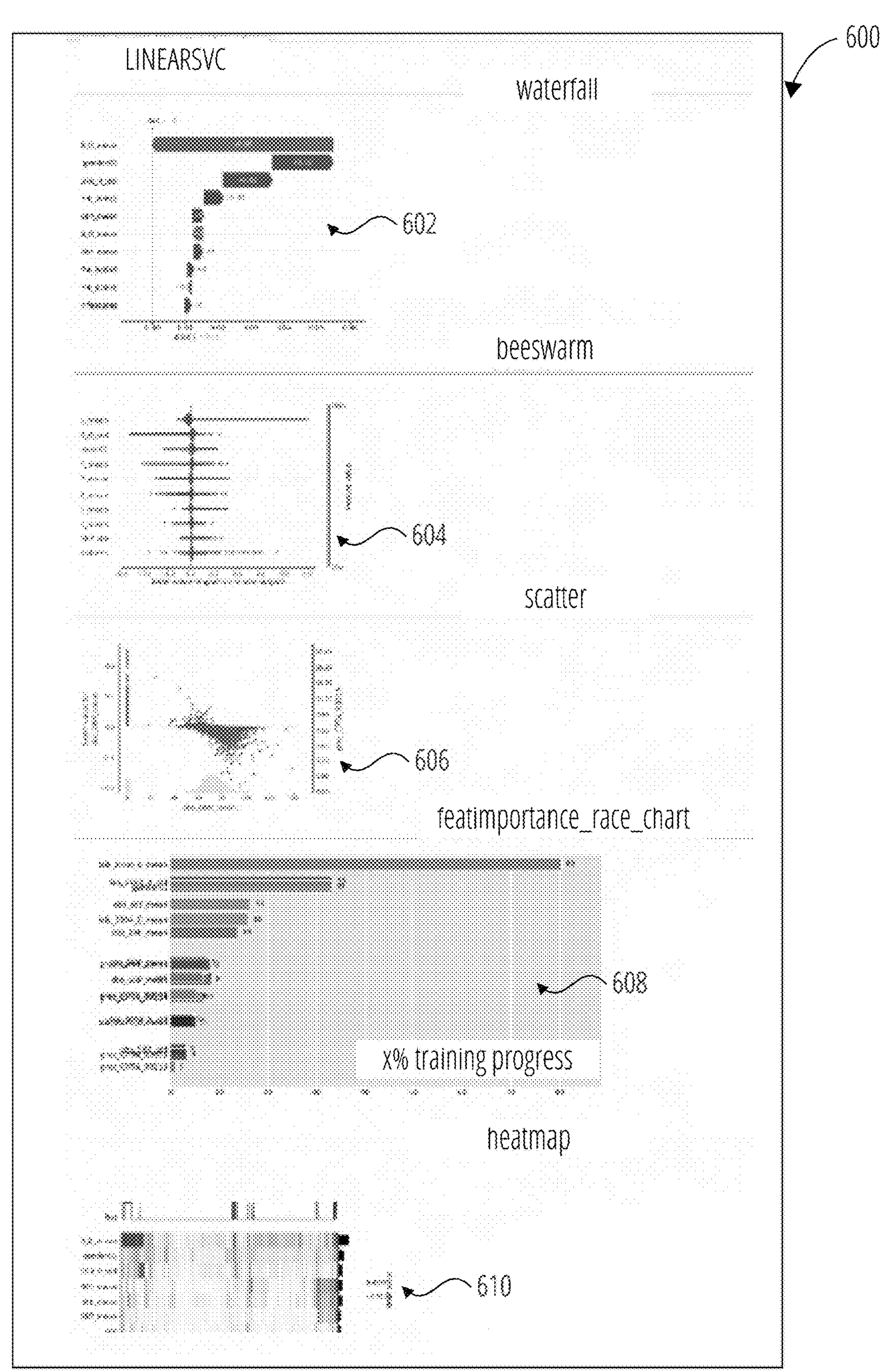
FIG. 6 illustrates an example interface including graphical representations providing understandability of training a particular model of a particular model type in accordance with at least one embodiment of the present disclosure.

FIG. 6 illustrates an example interface including graphical representations providing understandability of training a particular model of a particular model type in accordance with at least one embodiment of the present disclosure. Specifically, FIG. 6 depicts an example model interface 600. The model interface 600 includes a plurality of plot representation(s). The model interface 600 includes plot representation 602, plot representation 604, plot representation 606, plot representation 608, and plot representation 610. In some embodiments, the various plot representations are each associated with a particular model of a particular model type, for example a Linear SVC model as depicted. In some embodiments, the predictive computing entity 102 outputs the model interface 600 as a standalone interface for rendering, for example, or in other embodiments renders the model interface 600 as a sub-interface together with one or more other sub-interfaces, for example associated with other model(s) as described further herein.

In some embodiments, each of the plot representations 602-610 is configured based on in part on corresponding Shapley values determined during training of the model. For example, in some embodiments, the predictive computing entity 102 trains the model as depicted and described herein utilizing a multi-phase training process, where each training phase is associated with a different percentage portion of a training data set. The predictive computing entity 102 may determine a set of Shapley values associated with each training phase, and/or generate one or more sets of synthetic Shapley values based on in part on the Shapley values determined during the training phases. In this regard, the predictive computing entity 102 may derive or in some embodiments receive a final set of Shapley values, for example updated SHAP vector 406, that are utilized to generate each of the plot representations 602-610.

Each of the plot representation 602-610 depicts different visual representation(s) of the Shapley values at a particular stage. In some embodiments, for example, at any given time each of the plot representation 602-610 may depict the Shapley values associated with a particular training phase or generated synthetic Shapley values representing an interpolated and/or otherwise synthetic intermediary training phase. As illustrated, the plot representation 602 depicts the data values, for example each of the Shapley values of a particular set of Shapley values for various features, as a waterfall representation. The plot representation 604 depicts the data values, for example each of the Shapley values of a particular set of Shapley values for various features, as a beeswarm representation. The plot representation 606 depicts the data values, for example each of the Shapley values of a particular set of Shapley values for various features, as a scatter plot representation. The plot representation 608 depicts the data values, for example each of the Shapley values of a particular set of Shapley values for various features, as a race chart representation. The plot representation 610 depicts the data values, for example each of the Shapley values of a particular set of Shapley values for various features, as a heatmap representation. In some embodiments, the different plot types, or particular frames of animations of such different plot types, are rendered based on the same portions of Shapley values, which may be synthetic or actual.

In some embodiments, each representation embodies or includes a specially configured animation. In this regard, in some embodiments each plot representation in the model interface 600 is updated to reflect a particular frame of the animation at a particular time, and to iterate through frames to present the animation depicting changing Shapley values in the set of Shapley values as training of the model progressed utilizing different portions of a training data set. As such, each plot representation in some embodiments is updated by a frame-by-frame basis. In some such embodiments, each plot representation is updated to represent a frame of a corresponding animation such that each plot representation at a particular frame visually depicts the same particular portion of the set of Shapley values. For example, in some embodiments, a first subset of the set of Shapley values (e.g., a first vector of Shapley values in the set of Shapley values) represents the Shapley values after training with a particular percentage split of a training data set, and each plot representation depicts a frame representing a visual representation of the first subset of the set of Shapley values. Subsequently, a second subset of the set of Shapley values (e.g., a second vector of Shapley value in the set of Shapley values) represents the Shapley values after training with a next percentage split of the training data set, or alternatively an interpolated intermediary training phase, and each plot representation is updated to depict a second frame representing the visual representation of the second subset of the set of Shapley values. This process may continue to depict a frame for each subset of the set of Shapley values, where an animation is formulated via playback of the frames at a particular framerate.

Figure 7:
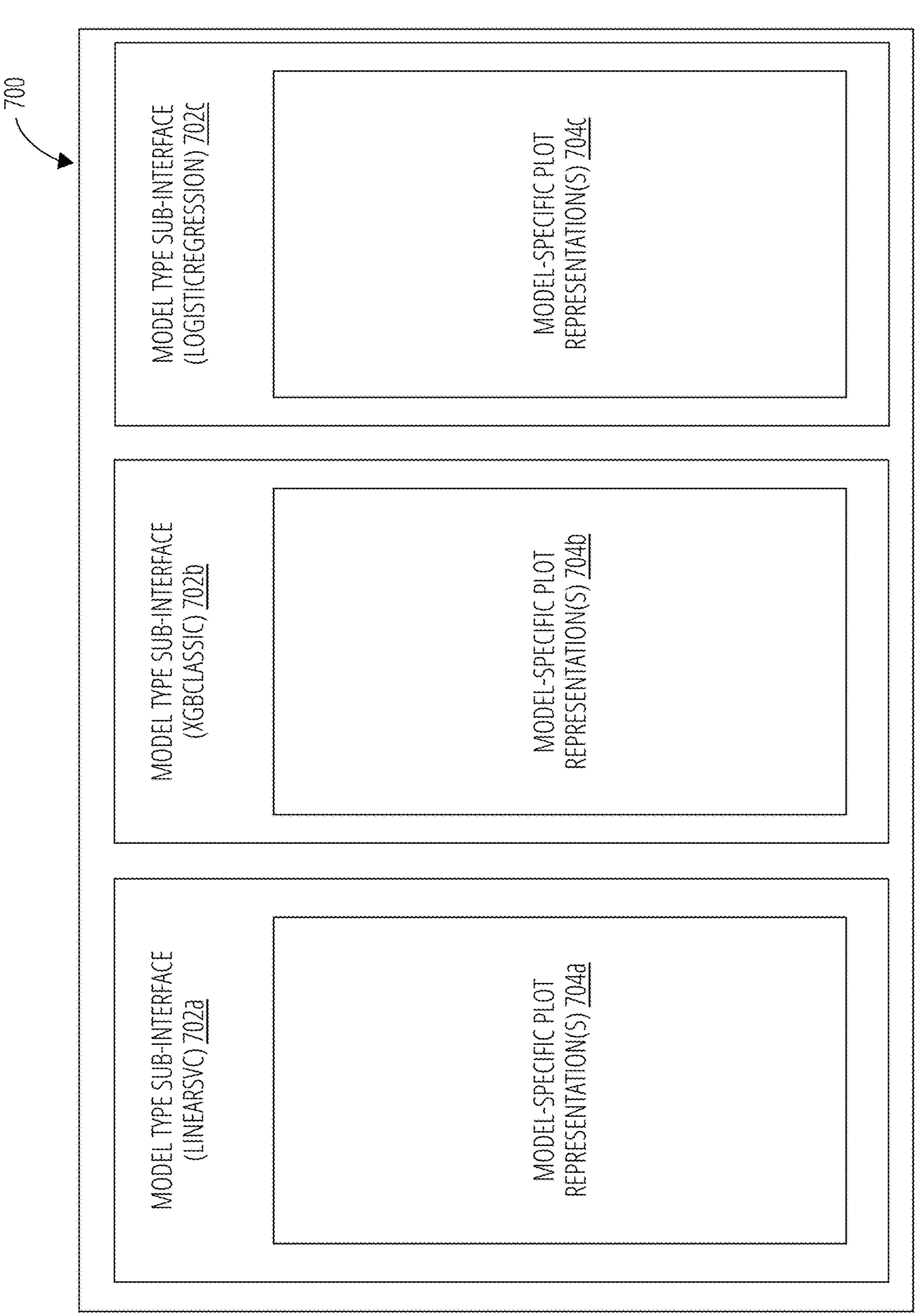
FIG. 7 illustrates an example interface including graphical representations providing understandability of training a plurality of models of different model types in accordance with at least one embodiment of the present disclosure.

FIG. 7 illustrates an example interface including graphical representations providing understandability of training a plurality of models of different model types in accordance with at least one embodiment of the present disclosure. Specifically, FIG. 7 depicts an example interface 700. The interface 700 includes a plurality of sub-interfaces specially configured to depict visual representations associated with training of different models of different model types. As illustrated, interface 700 includes sub-interface 702*a* depicting visual representations associated with training of a Linear SVC model, sub-interface 702*b* depicting visual representations associated with training of a XGB Classic model, and sub-interface 702*c* depicting visual representations associated with training of a logistic regression model. In some embodiments, each of the models corresponding to the sub-interfaces 702*a*, 702*b*, and 702*c* is trained as depicted and described herein with respect to multiple training phases, and a corresponding set of Shapley values including determined Shapley values and/or derived synthetic Shapley values therefrom as depicted and described herein. In this regard, the interface 700 may be utilized to analyze different robustness, accuracy, and/or other factors between various model types simultaneously through such visualizations.

In some embodiments, each model type-specific sub-interface includes any number of plot representation(s) corresponding to the particular model type associated with the sub-interface. For example as illustrated, sub-interface 702*a* includes model-specific plot representation(s) 704*a*, sub-interface 702*b* includes model-specific plot representation(s) 704*b*, and sub-interface 702*c* includes model-specific plot representation(s) 704*c*. In some embodiments, the model-specific plot representation(s) associated with a particular model of a particular model type includes static visual representation(s), animation(s), and/or the like, specially configured based on in part on a set of Shapley values determined for training of the particular model of the particular model type. In some embodiments, the model-specific plot representation(s) 704*a* includes or is embodied by the model interface 600 as depicted and described, wherein the model interface 600 is configured based on in part on the set of Shapley values for a particular model and/or model type, for example a first set of Shapley values corresponding to training of a Linear SVC model for the model-specific plot representation(s) 704*a* of sub-interface 702*a*, a second set of Shapley values corresponding to training of a XGB Classic model for the model-specific plot representation(s) 704*b* corresponding to the sub-interface 702*b*, and a third set of Shapley values corresponding to training of a logistic regression model for the model-specific plot representation(s) 704*c* of the sub-interface 702*c*. It should be appreciated that the interface 700 may include any number of sub-interfaces corresponding to any number of model(s) and/or model types.

In some embodiments, the various sub-interfaces are updated in a manner that synchronizes particular frames of animation(s) in each of such sub-interfaces. For example, in some embodiments, the set of Shapley values corresponding to each model associated with a sub-interface includes the same number of subsets of Shapley values and/or otherwise is utilized to generate the same number of animation frames. In this regard, the sub-interface 702*a*-702*c* may each be updated to depict the learnings of each corresponding model at particular benchmarks (e.g., 5% of a training data set, 10% of a training data set, 20% of a training data set, and/or the like) in parallel with one another such that the individual sub-interfaces may be readily visually compared by an end user.

Figure 8:
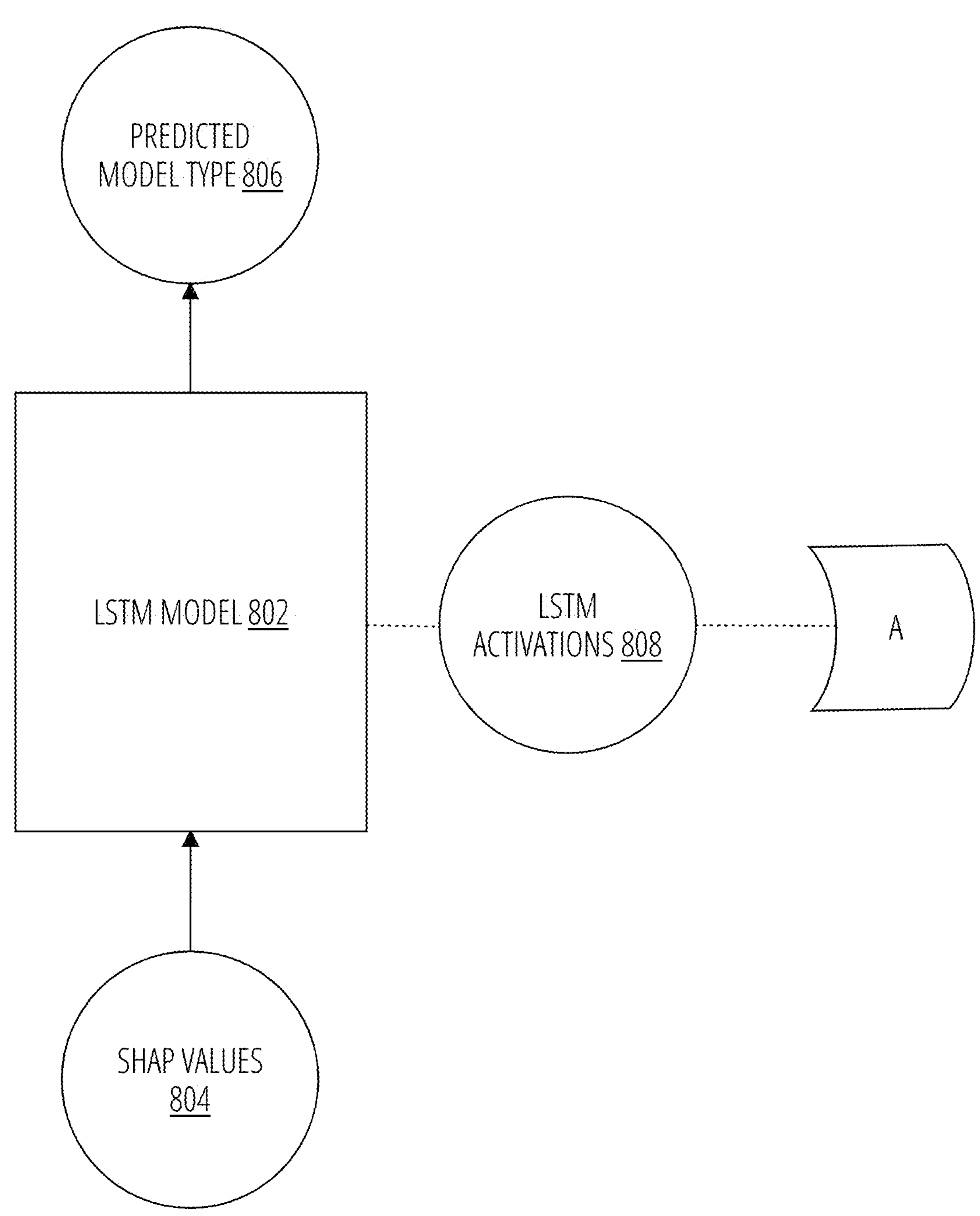
FIG. 8 illustrates a visualization of an example process for generation of LSTM activations for a particular model in accordance with at least one embodiment of the present disclosure.

Example Data Environments for Improved Embedding Space Generation of the Disclosure FIG. 8 illustrates a visualization of an example process for generation of LSTM activations for a particular model in accordance with at least one embodiment of the present disclosure. Specifically, FIG. 8 illustrates visualization of generation of LSTM activations 808 associated with a particular LSTM model 802. The LSTM model 802 in some embodiments generates the LSTM activations 808 from particular Shapley values as input data, for example SHAP values 804. As illustrated, the SHAP values 804 embodies or includes a set of Shapley values without any synthetic Shapley values, for example including only the subsets of Shapley values generated from different training phases based on different percentage splits of a training data set. In some other embodiments, the SHAP values 802 may include one or more portion(s) of synthetic Shapley values..

In some embodiments, the LSTM model 802 is specially configured (e.g., trained) to generate a predicted model type 806 based on in part on the SHAP values 804. In this regard, in some embodiments the LSTM model 802 is specially trained to generate the predicted model type 806 including or embodying a label of a predicted model type. The predicted model type 806 thus represents a label that is intended to predict the predicted model type for the model that generated the SHAP values 804. In some embodiments, the LSTM model 802 is trained on different sets of Shapley values inputted as the SHAP values 804 generated by different model types, for example such that the LSTM model 802 is trained as a single model that generates a predicted model type 806 embodying a label prediction of the model type corresponding to inputted Shapley values based on such training. In this regard, during training of the LSTM model 802, the weights and/or activations embodying the model may be updated based on learnings that indicate what Shapley values are consistent with particular model types, and thereby learn to generate an accurate prediction of the predicted model type 806.

In some embodiments, the predictive computing entity 102 maintains and/or determines the LSTM model 802. For example, in some embodiments, the LSTM model 802 is associated with a particular model type or multiple model types. In some embodiments, the LSTM model 802 is predetermined or otherwise maintained by the predictive computing entity 102. In other embodiments, the predictive computing entity 102 determines and/or retrieves the LSTM model 802 for use, for example based at least in part on a model type associated with the SHAP values 804 and/or any other data available to the predictive computing entity 102.

In some embodiments, the LSTM activations 808 includes or embodies data embodying activation(s) of nodes at each layer of the LSTM model 802. In this regard, the LSTM activations 808 in some embodiments is defined based on in part on the activation function of the LSTM model 802 during training and/or use of the LSTM model 802. It will be appreciated that the activations of the LSTM model 802 may differ based on the model type utilized to generate the SHAP values 804, and/or other features associated with operation of the particular model associated with the SHAP values 804.

In some embodiments, the LSTM activations 808 is further processable for any of a myriad of purposes. In some embodiments, the LSTM activations 808 are processed by the predictive computing entity 102 to generate one or more embedded representation(s) of a corresponding model of a particular model type. Examples of generating such embedded representation(s) and/or visualizations thereof are further depicted and described herein, for example with respect to FIGS. 9 and 10.

Figure 9:
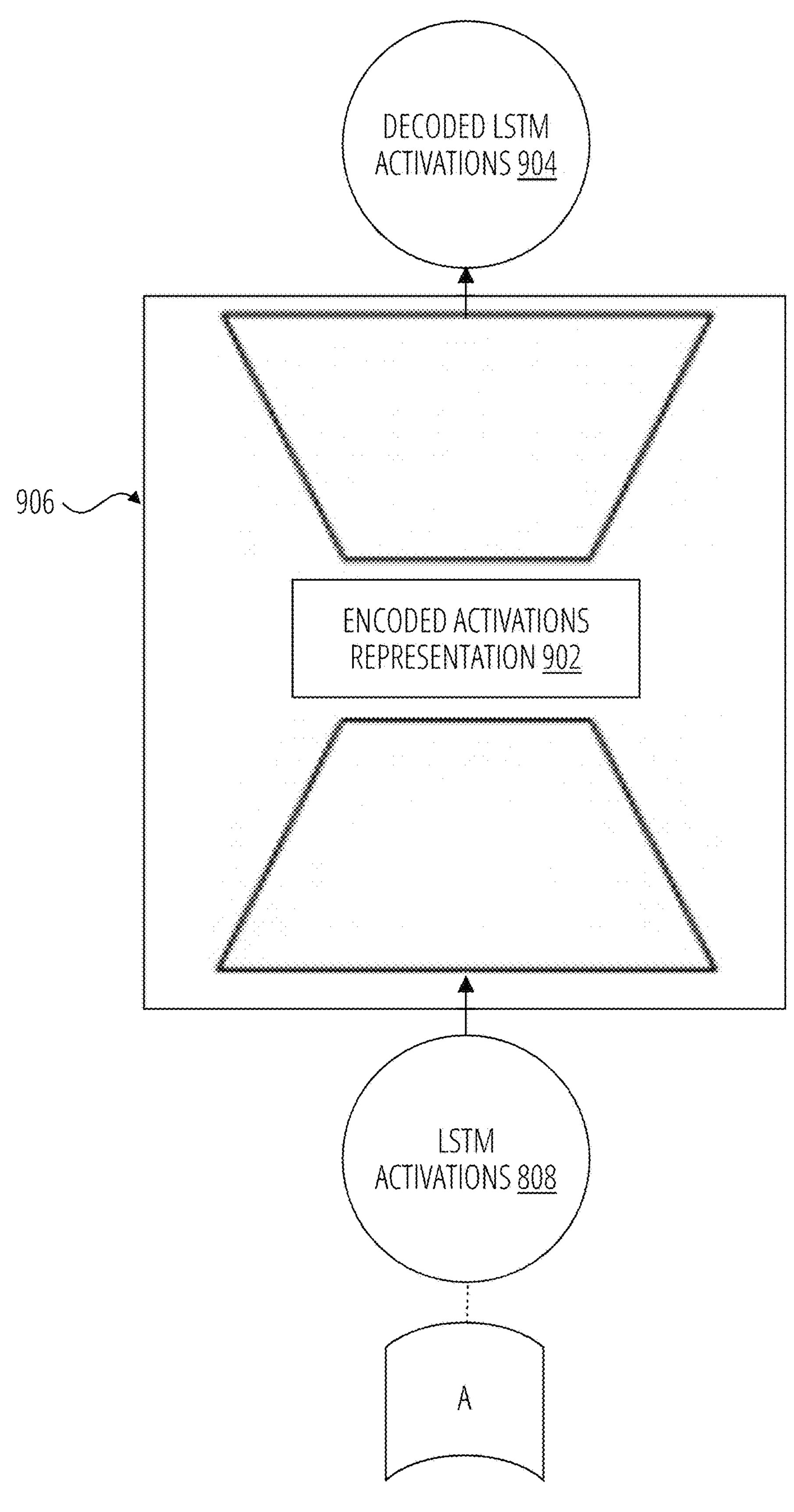
FIG. 9 illustrates a visualization of an example process for generation of an encoded activations representation in accordance with at least one embodiment of the present disclosure.

FIG. 9 illustrates a visualization of an example process for generating an encoded activations representation in accordance with at least one embodiment of the present disclosure. Specifically, FIG. 9 depicts operation of a particular autoencoder 906 based on in part on inputted LSTM activations. In some embodiments, the various data and models of FIG. 9 are maintained by one or more computing system(s) and/or device(s) thereof, for example predictive computing entity 102.

FIG. 9 specifically depicts processing of LSTM activations 808 by an autoencoder 906. The autoencoder 906 is trained to encode received input data and decode the internal embedded representation of such data to recreate a decoded version of the inputted data. As illustrated, for example, the autoencoder 906 is specially trained to generate decoded LSTM activations 904 from input data embodying or including LSTM activations 808. In some embodiments, the autoencoder 906 is trained based at least in part on LSTM activations corresponding to a plurality of different models, for example such different models embodying a variety of different model types. Accordingly, the autoencoder 906 may be trained to perform such encoding and decoding for activations of a given layer in a manner that is agnostic to the model type and/or corresponding label for the model that led to generation of such activations.

In some embodiments, the autoencoder 906 generates an encoded activations representation 902. The encoded activations representation 902 embodies or includes an encoded embedded representation of the LSTM activations 808. In this regard, the encoded activations representation 902 may represent the LSTM activations 808 with reduced dimensionality. For example, in some embodiments, the autoencoder 906 is specially configured to generate encoded activations representation 902 that encodes the LSTM activations 808 into two dimensions, such that the encoded representation is projectable to a two-dimensional embedding space. In some embodiments, the autoencoder 906 is trained in a manner that is model type or label agnostic, and in this regard learns without regard for such data. In this regard, in some such embodiments the autoencoder 906 learns to project such activations for different model types without regard for such labels, enabling similar activations of different model types to be similarly embedded (e.g., proximate to one another) based on learned similarities between different sets of such activations.

In some embodiments, the predictive computing entity 102 extracts the encoded activations representation 902 upon generation via at least an encoding portion of the autoencoder 906. For example, in some embodiments, the autoencoder 906 includes an encoder model and a decoder model, where the encoder model generates the encoded activations representation 902 from the inputted LSTM activations 808. In some such embodiments, the encoded activations representation 902 is utilized to map to one or more embedding space(s) and/or generating one or more visualization(s) based on in part on the encoded activations representation 902, for example as further described herein. In some embodiments, the predictive computing entity 102 maps the encoded activations representation 902 to a particular embedding space, for example to update the embedding space to include a data point representing the value of the encoded activations representation 902.

Example Embedding Space Interfaces of the Disclosure

Figure 10:
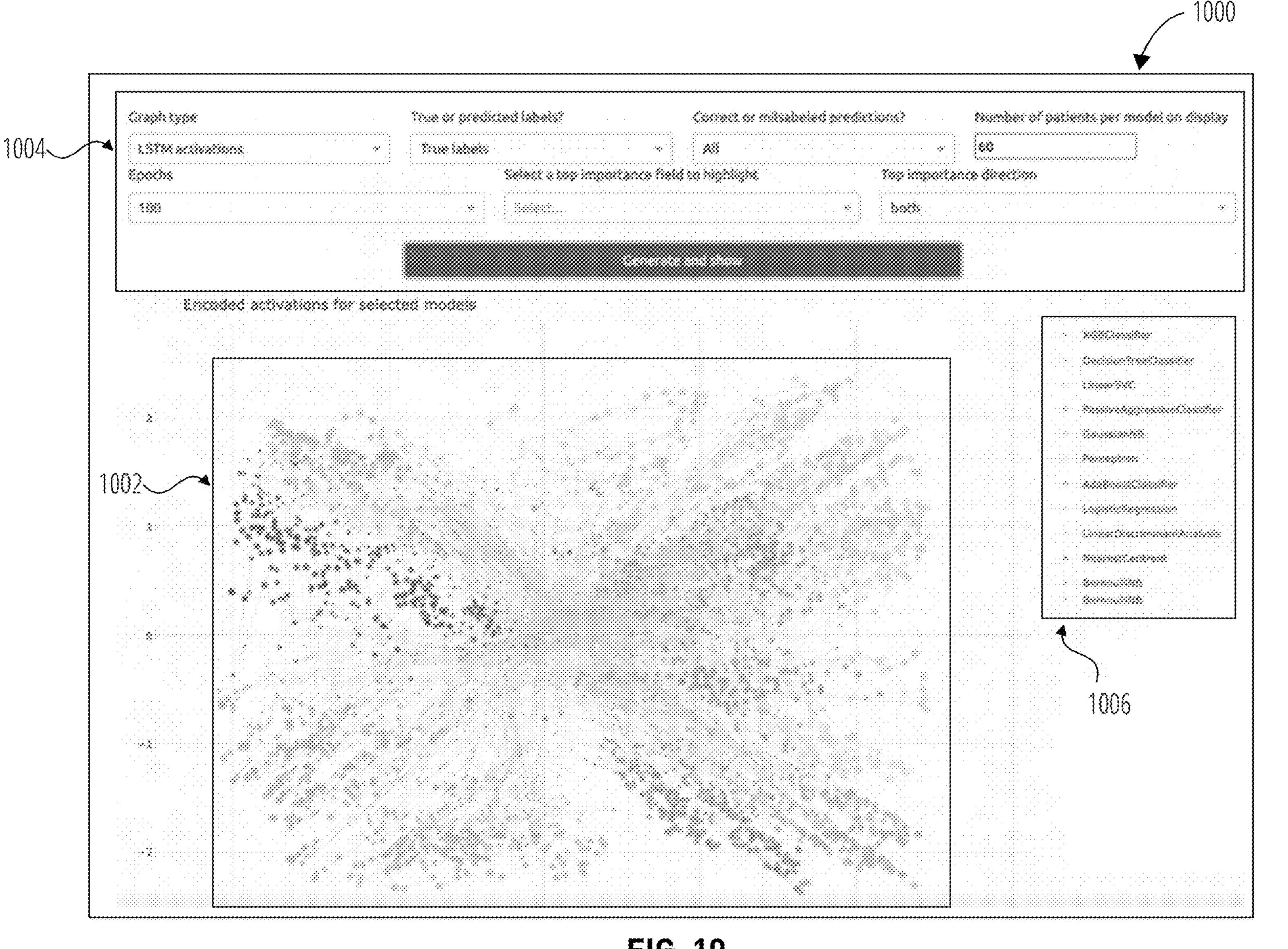
FIG. 10 illustrates an example interface including a graphical representation of an embedding space in accordance with at least one embodiment of the present disclosure.

FIG. 10 illustrates an example interface including a graphical representation of an embedding space in accordance with at least one embodiment of the present disclosure. Specifically, FIG. 10 depicts an example interface 1000. The interface 1000 includes an embedding space visualization 1002.

In some embodiments, the embedding space visualization 1002 embodies or includes a visualization of a particular embedding space within which one or more embedded representation(s) is mapped. As illustrated, in some embodiments each embedded representation embodies a data object and/or value mapping an encoded activations representation of LSTM activations to the embedding space. For example, in one example context where the LSTM activations are mapped to a two-dimensional representation, the values of the two-dimensional representation embodying the encoded activations representation 902 correspond to the coordinate points where a corresponding embedded representation is depicted in the embedding space.

In some embodiments, the embedded representations depicted in the embedding space visualization 1002 are depicted such that particular data points sharing characteristics and/or associated with similar characteristics are proximate to one another in the embedding space. In this regard, the embedding space visualization 1002 may depict such embedding plot representations with different portions of the visualization corresponding to the different characteristics. In some embodiments, for example, a first portion of the embedding space corresponds to models of the same model type, a second portion of the embedding space corresponds to models having similar Shapley values for particular feature(s), and a third portion of the embedding space corresponds to models having the same level of accuracy upon training.

In some embodiments, the interface 1000 includes embedding space configuration controls 1004. In some embodiments, the embedding space configuration controls 1004 includes one or more interface element(s) that receive parameter(s) in response to user engagement. The parameter(s) embody configuration parameter(s) utilized to generate the embedding space visualization 1002. For example, in some embodiments, the user may utilize the embedding space configuration controls 1004 to emphasize or otherwise highlight, via input of highlight criteria, particular fields corresponding to feature(s) known or otherwise determined to be important. In some such contexts, a user selects a particular feature known to be a most clinically important portion of information, such as a glucose level. In this regard, the embedding space visualization 1002 may be updated to depict or otherwise highlight particular data points corresponding to a high importance for the feature selected via the embedding space configuration controls 1004, and/or otherwise filter other data points where such a selected feature is deemed not important. The data values that remain or are otherwise highlighted may correspond to particular model(s) and/or model types that are consistent with the clinical knowledge inputted via the embedding space configuration controls 1004. For example, XGBClassifier data points may be emphasized based at least in part on the activations represented by the embedded representations in the embedding space visualization 1002, enabling the user to identify the XGBClassifier as likely best due to its consistency with such clinical knowledge.

In some embodiments, the interface 1000 includes one or more highlight control(s) 1006. In some embodiments, the highlight control(s) 1006 includes one or more interface element(s) that enable inputting of highlight criteria. The received highlighted criteria are utilized to emphasize particular embedded representation(s) in the embedding space visualization 1002 and/or filter one or more embedded representation(s) from the embedding space visualization 1002. For example, in some embodiments, the highlight control(s) 1006 includes one or more interface element(s) for highlighting particular embedded representation(s) corresponding to particular model type(s). In other embodiments, the highlight control(s) 1006 includes one or more interface element(s) for highlighting particular embedded representation(s) corresponding to other particular characteristic(s) associated with a model, model type, and/or other characteristic associated with particular embedded representation(s), and/or the like. The highlight control(s) 1006 in some embodiments filters one or more embedded representation(s) from the embedding space visualization 1002 by de-rendering such embedded representation(s). For example, the highlight control(s) 1006 may be utilized to filter particular model type(s), high importance feature(s), and/or the like to declutter the embedding space visualization 1002.

Example Processes of the Disclosure

Having described example systems and apparatuses, related data flows, and data architectures, in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

Although the example processes depict a particular sequence of operations, the sequence may be altered without departing from the scope of the present disclosure. For example, some of the operations depicted may be performed in parallel or in a different sequence that does not materially affect the function of the processes.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 11:
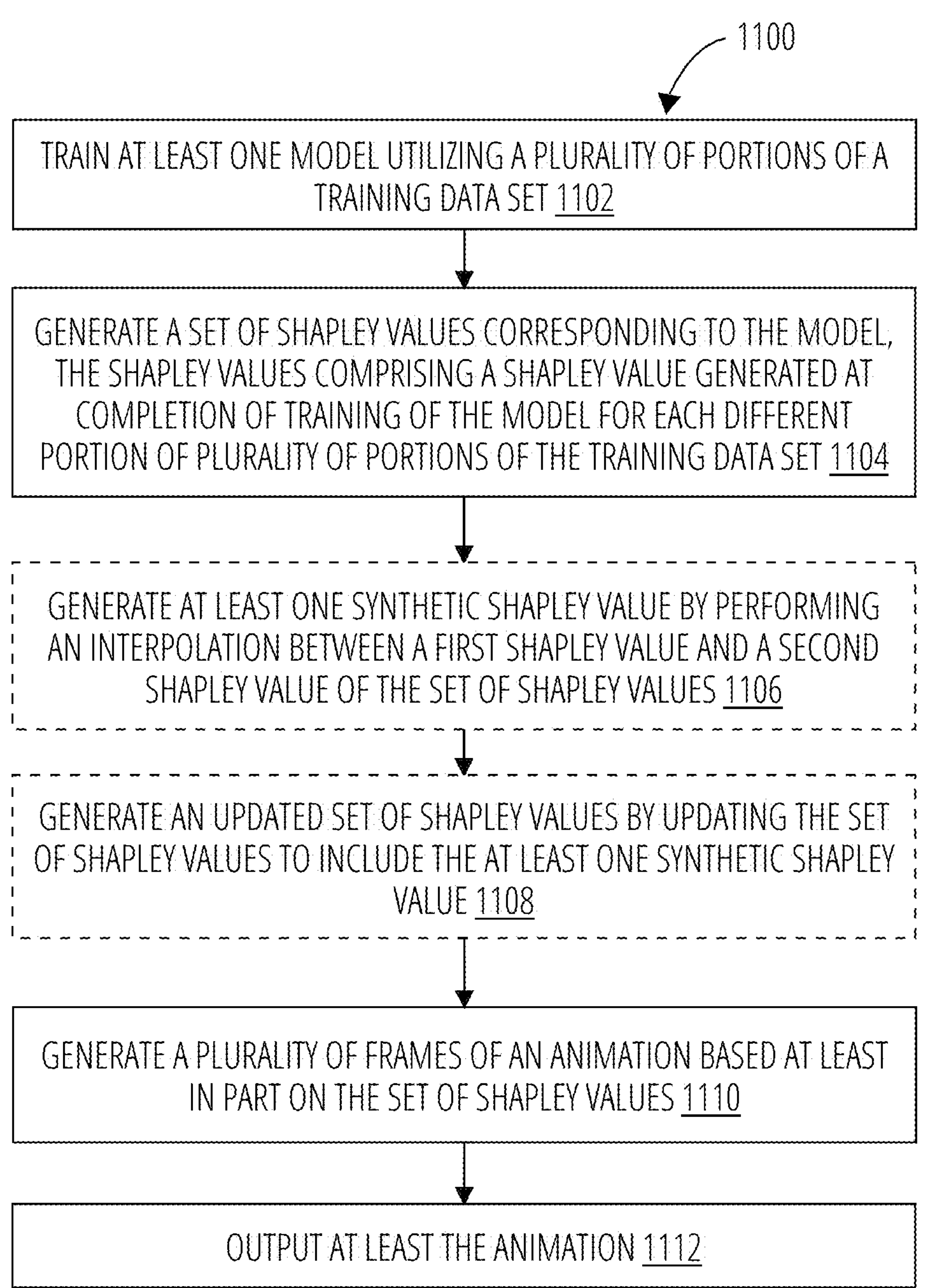
FIG. 11 illustrates a flowchart including example operations for generating and using an animation based on in part on a set of Shapley values in accordance with at least one embodiment of the present disclosure.

FIG. 11 illustrates a flowchart including example operations for generating and using an animation based on in part on a set of Shapley values in accordance with at least one embodiment of the present disclosure. Specifically, FIG. 11 depicts an example process 1100. The process 1100 embodies an example computer-implemented method. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the predictive computing entity 102 alone or in communication with one or more other component(s), device(s), system(s), and/or the like. In this regard, in some such embodiments, the predictive computing entity 102 is specially configured by computer-coded instructions (e.g., computer program instructions) stored thereon, for example in the memory element 106 and/or another component depicted and/or described herein and/or otherwise accessible to the predictive computing entity 102, for performing the operations as depicted and described. In some embodiments, the predictive computing entity 102 is in communication with one or more external apparatus(es), system(s), device(s), and/or the like, to perform one or more of the operations as depicted and described. In some embodiments, the predictive computing entity 102 is in communication with separate component(s) of a network, external network(s), and/or the like, to perform one or more of the operation(s) as depicted and described. For purposes of simplifying the description, the process 1100 is described as performed by and from the perspective of the predictive computing entity 102.

Although the example process 1100 depicts a particular sequence of operations, the sequence may be altered without departing from the scope of the present disclosure. For example, some of the operations depicted may be performed in parallel or in a different sequence that does not materially affect the function of the process 1100. In other examples, different components of an example device or system that implements the process 1100 may perform functions at substantially the same time or in a specific sequence.

In some embodiments, the method includes training at least one model utilizing a plurality of portions of a training data set at operation 1102. For example, in some embodiments, the method includes training a model utilizing a first portion of the training data set, where the first portion of the training data includes a particular percentage of the complete training data set. As training based on a particular portion of the training data is completed, in some embodiments the predictive computing entity 102 generates Shapley value(s) and/or other explainability metric data values associated with the model based on in part on the current state of training. The method then may train a model utilizing a second portion of the training data set, where the second portion of training data includes a second percentage of the complete training data set. As the next training phase is completed based on the second portion of the training data, in some embodiments the predictive computing entity 102 then generates Shapley value(s) and/or other explainability metric values associated with the model based on in part on the new current state of training. Such a process may be repeated for any number of training phases, each associated with a different portion of a complete training data set. In some embodiments, the percentage of the complete training data set at each training phase increases by a particular differential, a particular algorithmically-determined value (e.g., doubling), increases to predefined percentages, and/or the like. In some embodiments, the predictive computing entity 102 is configured to perform a predefined set of training phases corresponding to predefined percentage portions of the training data set, for example training based on 5% of the training data set, then 10% of the training data set, then 20% of the training data set, then increasing by 10% increments until 100% of the training data set has been utilized. In some embodiments, the training is performed by an external system or device.

In some embodiments, the method includes generating a set of Shapley values corresponding to the model at operation 1104. The set of Shapley values includes Shapley values generated at completion of training of the model for each different portion of plurality of portions of the training data set. In some embodiments, the predictive computing entity 102 stores a vector of Shapley values (or other explainability metric values) associated with each phase of training the model. For example, a first vector of Shapley values may be stored associated with training of the model utilizing the 5% portion of the training data set, a second vector of Shapley values may be stored associated with training of the model utilizing the 10% portion of the training data set, and so on for any number of splits of the complete training data set. In this regard, the set of Shapley values may include a combination or ordered arrangement the individual vector of Shapley values for each training phase. In some embodiments, the predictive computing entity 102 otherwise identifies the set of Shapley values. For example, the predictive computing entity 102 may identify the set of Shapley values by retrieving the set of Shapley values from a data repository accessible to the predictive computing entity 102. The set of Shapley values may have been stored to the data repository by the predictive computing entity 102 during training, for example, and/or by another device or system that performed the training. It should be appreciated that in some embodiments the predictive computing entity 102 identifies the set of Shapley values by generating the set of Shapley values as described herein.

In some embodiments, the method includes generating at least one synthetic Shapley value at optional operation 1106. In some embodiments, the predictive computing entity 102 generates the at least one synthetic Shapley value by performing an interpolation between a first Shapley value and a second Shapley value of the set of Shapley values. For example, in some embodiments, the predictive computing entity 102 identifies a first Shapley value from a first vector of Shapley values associated with a first training phase and feature, and a second Shapley value associated with the next training phase and the same feature. In some such embodiments, the predictive computing entity 102 then generates a synthetic Shapley value by linearly interpolating between the first Shapley value and the second Shapley value. In this regard, in some embodiments the predictive computing entity 102 generates vector(s) of synthetic Shapley values that represent values interpolated between training phases of the model.

In some embodiments, the method includes generating an updated set of Shapley values at optional operation 1108. In some embodiments, the predictive computing entity 102 generates the updated set of Shapley values by updating the set of Shapley values to include the at least one synthetic Shapley value. In some embodiments, the updated set of Shapley values includes one or more vector(s) of synthetic Shapley values, each vector arranged in the set of Shapley values between a vector of Shapley values for a first training phase and a vector of Shapley values for a second training phase performed for the model.

In some embodiments, the method includes generating a plurality of frames of an animation based on in part on the set of Shapley values at operation 1110. In some embodiments, the predictive computing entity 102 is configured to generate a graphical representation of data values, where the Shapley values for a particular feature in each vector in the set of Shapley values is utilized to depict a particular portion of the graphical representation. In this regard, the graphical representation may be generated that is updated to visually depict the Shapley value corresponding to a particular data property (e.g., a particular feature) at each sub-vector of Shapley values represented in the set of Shapley values. In this regard, the frames may be generated based on in part on the set of Shapley values received from the training phases of the model, and/or may be generated on the set of Shapley values including the synthetic Shapley values utilized to generate the updated set of Shapley values as described herein.

In some embodiments, the method includes outputting at least the animation at operation 1112. In some embodiments, the predictive computing entity 102 outputs the animation to at least one user interface, such as a dashboard. In some such embodiments, the predictive computing entity 102 outputs the animation directly to a display depicting the particular user interface. In other embodiments, the predictive computing entity 102 causes rendering of the animation, for example via transmission of data to a client device or another system that processes the data for rendering. Additionally or alternatively, in some embodiments, the method includes outputting at least the animation to another system or process for further processing.

In some embodiments, the method includes outputting the animation on its own. In some embodiments, the method includes outputting the animation with one or more other portion(s) of data. For example, in some embodiments, the predictive computing entity 102 generates a plurality of animations and/or visual representations of data, and outputs all of the visual representations of data to a single user interface. In some embodiments, the predictive computing entity 102 generates one or more other animations corresponding to a plurality of models in the same manner as described with respect to the operations 1102-1110, and outputs the animation together with one or more of the other generated animations associated with the same model and/or a plurality of different models.

Additionally or alternatively, the predictive computing entity 102 generates a plurality of different types of graphical representations based on in part on the set of Shapley values, for example different plot type (e.g., a beeswarm, scatter plot, waterfall, and/or the like). In some embodiments, an animation is generated for each of a plurality of plot type to be generated. In some such embodiments, the method includes outputting each of the generated plot type(s) and/or animation(s).

Figure 12:
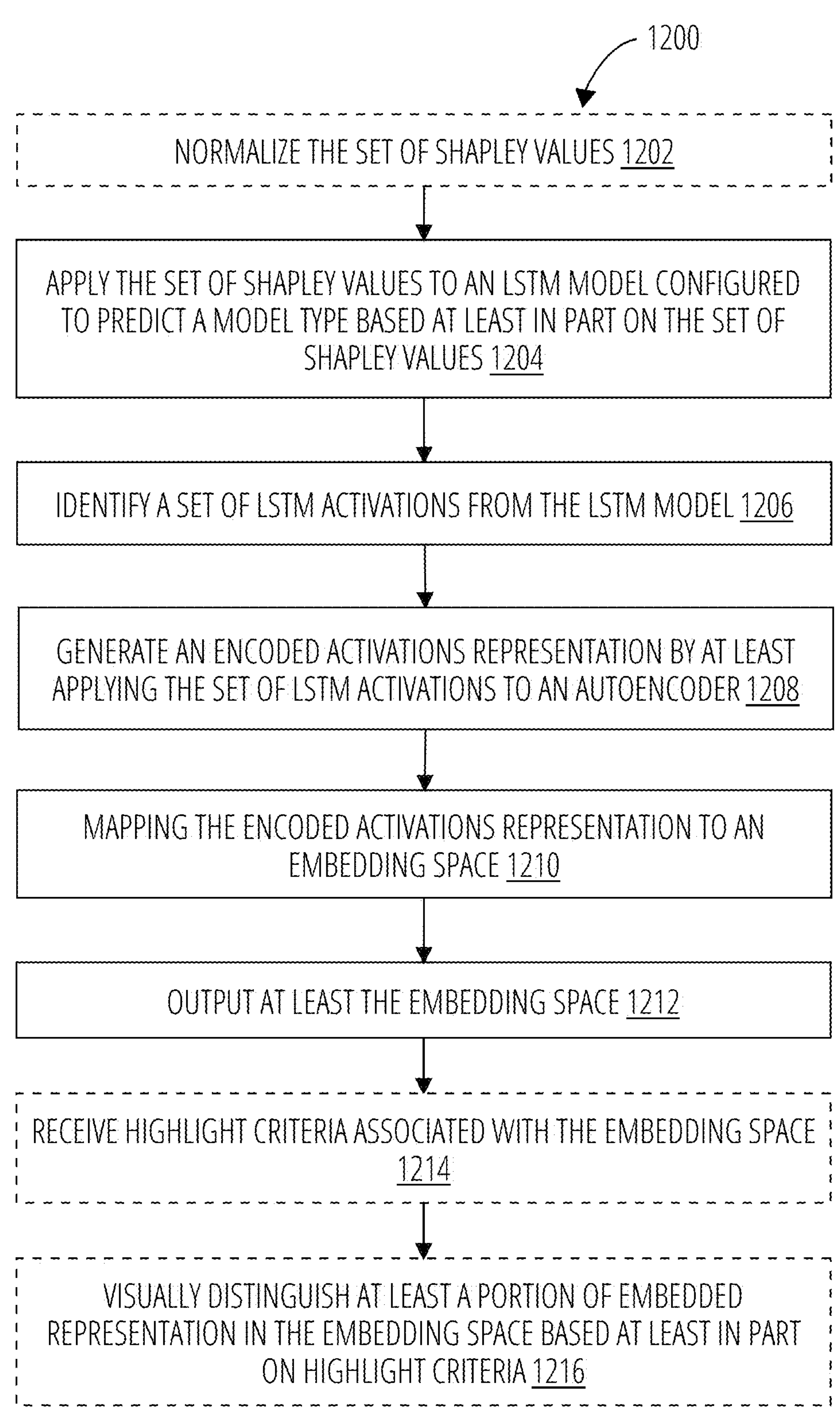
FIG. 12 illustrates a flowchart including example operations for generating and using an embedding space based on an encoded activation representation derived from a set of Shapley values in accordance with at least one embodiment of the present disclosure.

FIG. 12 illustrates a flowchart including example operations for generating and using an embedding space based on an encoded activation representation derived from a set of Shapley values in accordance with at least one embodiment of the present disclosure. Specifically, FIG. 12 illustrates a process 1200. The process 1200 embodies an example computer-implemented method. In some embodiments, the process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the predictive computing entity 102 alone or in communication with one or more other component(s), device(s), system(s), and/or the like. In this regard, in some such embodiments, the predictive computing entity 102 is specially configured by computer-coded instructions (e.g., computer program instructions) stored thereon, for example in the memory element 106 and/or another component depicted and/or described herein and/or otherwise accessible to the predictive computing entity 102, for performing the operations as depicted and described. In some embodiments, the predictive computing entity 102 is in communication with one or more external apparatus(es), system(s), device(s), and/or the like, to perform one or more of the operations as depicted and described. For example, the predictive computing entity 102 in some embodiments is in communication with a separate primary system, client system, and/or the like. For purposes of simplifying the description, the process 1200 is described as performed by and from the perspective of the predictive computing entity 102.

In some embodiments, the process 1200 begins at optional operation 1202. The process 1200 may begin after one or more operational blocks depicted and/or described with respect to any one of the other processes described herein. In this regard, some or all of the process 1200 may replace or supplement one or more operations depicted and/or described with respect to any of the processes described herein. For example, in some embodiments, the process 1200 begins after optional operation 1108, and may replace, supplant, and/or otherwise supplement one or more operations of the process 1100. Upon completion of the process 1200, the flow of operations may terminate. Additionally or alternatively, as depicted, upon completion of the process 1200 in some embodiments, flow may return to one or more operation(s) of another process, such as the operation 1110. It will be appreciated that, in some embodiments, the process 1200 embodies a sub-process of one or more other process(es) depicted and/or described herein, for example the process 1100.

Although the example process 1200 depicts a particular sequence of operations, the sequence may be altered without departing from the scope of the present disclosure. For example, some of the operations depicted may be performed in parallel or in a different sequence that does not materially affect the function of the process 1200. In other examples, different components of an example device or system that implements the process 1200 may perform functions at substantially the same time or in a specific sequence.

In some embodiments, the method includes normalizing the set of Shapley values at optional operation 1202. In some embodiments, each Shapley value in the set of Shapley values is normalized based on in part on rank and sign of the Shapley value. In some embodiments, the predictive computing entity 102 is configured to utilize a particular determinable normalization algorithm to normalize each Shapley value in the set of Shapley values. In some embodiments, the normalized Shapley value for a given Shapley value replaces that Shapley value in the set of Shapley values for further processing. In some embodiments, the normalized Shapley values diminish the effects of biasing particular model implementations having particular characteristics, such as spurious proxies of features in decision trees.

In some embodiments, the method includes applying the set of Shapley values to an LSTM model configured to predict a model type based on in part on the set of Shapley values at operation 1204. In some embodiments, the set of Shapley values includes the set of Shapley values and/or synthetic Shapley values as described herein. In some embodiments, the set of Shapley values includes the set of normalized Shapley values.

In some embodiments, the LSTM model is specially trained to predict a label representing a model type for a particular model. The LSTM model in some embodiments is configured to generate the predicted model type based on in part on an inputted set of Shapley values. In this regard, the LSTM model may be specially configured to learn a particular model type based on in part on the Shapley values corresponding to at a particular training phase of a model of a particular model type. In some embodiments, the predictive computing entity 102 performs both the training of the LSTM model and the corresponding use of the LSTM model. In some embodiments, the predictive computing entity 102 includes an LSTM model trained via a set of Shapley values for each model type of a plurality of model types, for example corresponding to one or more model(s) for which explainability is to be provided. For example, in some embodiments, the predictive computing entity 102 includes a LSTM model trained to predict a label corresponding to an XGB Classic model type, a linear regression model type, a Linear SVC model type, and/or the like.

In some embodiments, the method includes determining a model type corresponding to the model being utilized to generate the set of Shapley values as described with respect to operation 1104 and/or optional operation 1108. In some embodiments, the LSTM model is further trained based at least in part on the determined model type.

In some embodiments, the method includes identifying a set of LSTM activations from the LSTM model at operation 1206. In some embodiments, the set of LSTM activations represents the set of LSTM activations performed by the LSTM model based on a particular input data including at least the set of Shapley values to be processed. In some embodiments, the set of LSTM activations includes LSTM activations from each layer of the particular LSTM model.

In some embodiments, the method includes generating an encoded activations representation at operation 1208. In some embodiments, the method generates an encoded activations representation by at least by at least applying the set of LSTM activations to an autoencoder. In some embodiments, the autoencoder is specially trained based on LSTM activation codes to encode and decode a set of LSTM activations. In some embodiments, the autoencoder is configured to encode the LSTM activations to a lowest dimensionality, for example a two-dimensional representation. In some embodiments, the lowest dimensionality encoding generated by the autoencoder embodies the encoded activations representation corresponding to the set of LSTM activations (e.g., a two-dimensional vector representation of the LSTM activations as generated by the autoencoder). In some such embodiments, the autoencoder is trained and/or performs in a manner that is agnostic to the model type corresponding to LSTM activations being processed.

In some embodiments, the method includes determining a particular autoencoder for use. For example, in some embodiments, the predictive computing entity 102 maintains one or more autoencoder(s), each autoencoder corresponding to a different model type. In this regard, in some embodiments, the method includes determining a particular autoencoder corresponding to the model type of the model that generated the set of Shapley values utilized by the LSTM model to generate the LSTM activations to be processed by the autoencoder. The determined autoencoder is subsequently usable for processing the LSTM activations.

In some embodiments, the method includes mapping the encoded activations representation to an embedding space at operation 1210. In some embodiments, the method includes projecting the encoded activations representations into the embedding space. In some embodiments, the embedding space is embodied by a two-dimensional space. In this regard, different groupings of data points in the embedding space that share one or more characteristics may correspond to similar locations in the embedding space.

In some embodiments, the method includes outputting at least the embedding space at operation 1212. In some embodiments, the method includes outputting the embedding space by causing rendering of the embedding space, with some or all mapped data points therein, to a display of the predictive computing entity 102. Additionally or alternatively, in some embodiments, the method includes outputting the embedding space by causing rendering of the embedding space to an external device for rendering. Additionally or alternatively, in some embodiments, the method includes outputting the embedding space to another system and/or process for further processing.

In some embodiments, the method includes receiving highlight criteria associated with the embedding space at optional operation 1214. In some such embodiments, the highlighted criteria represent particular data value(s) for one or more data properties that are utilized to emphasize particular data points (e.g., embedded representation(s)) in the embedding space and/or otherwise filter out other particular data points in the embedding space. In some embodiments, the highlighted criteria are received in response to user engagement.

In some embodiments, the method includes visually distinguish at least a portion of embedded representations in the embedding space based on in part on highlight criteria at optional operation 1216. For example, in some embodiments, the method includes altering the representation of a portion of embedded representations in the embedding space within an interface, such as by highlighting interface elements corresponding to such embedded representations, increasing the size of such interface elements corresponding to such embedded representations, and/or the like. Additionally or alternatively, in some embodiments, the portion of embedded representations is emphasized by filtering out the remaining portions of embedded representations from a rendered representation of the embedding space. Alternatively, in some embodiments, the embedded representations that corresponds to the highlight criteria may be filtered from the representation of the embedding space to emphasize the remaining portions of the embedding space.

CONCLUSION

Embodiments of the present disclosure can be implemented in various ways, including as computer program products that comprise articles of manufacture. Such computer program products can include one or more software components including, for example, software objects, methods, data structures, or the like. A software component can be coded in any of a variety of programming languages. An illustrative programming language can be a lower-level programming language such as an assembly language associated with a particular hardware architecture and/or operating system platform. A software component comprising assembly language instructions can require conversion into executable machine code by an assembler prior to execution by the hardware architecture and/or platform. Another example programming language can be a higher-level programming language that can be portable across multiple architectures. A software component comprising higher-level programming language instructions can require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages can be executed directly by an operating system or other software component without having to be first transformed into another form. A software component can be stored as a file or other data storage construct. Software components of a similar type or functionally related can be stored together such as, for example, in a particular directory, folder, or library. Software components can be static (e.g., pre-established, or fixed) or dynamic (e.g., created or modified at the time of execution).

A computer program product can include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium can include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium can also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium can also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium can also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium can include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media can be substituted for or used in addition to the computer-readable storage media described above.

As should be appreciated, various embodiments of the present disclosure can also be implemented as methods, apparatus, systems, computing devices, computing entities, and/or the like. As such, embodiments of the present disclosure can take the form of an apparatus, system, computing device, computing entity, and/or the like executing instructions stored on a non-transitory computer-readable storage medium to perform certain steps or operations. Thus, embodiments of the present disclosure can also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations can be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a non-transitory computer-readable storage medium for execution. For example, retrieval, loading, and execution of code can be performed sequentially such that one instruction is retrieved, loaded, and executed at a time. In some example embodiments, retrieval, loading, and/or execution can be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

EXAMPLES

Example 1. A computer-implemented method comprising: identifying, by the one or more processors, a set of Shapley values corresponding to the at least one machine-learning model, the set of Shapley values comprising a Shapley value generated after completion of training of the at least one machine-learning model for each different portion of plurality of portions of the training data set; generating, by the one or more processors, a plurality of frames of an animation based on in part on the set of Shapley values; and outputting, by the one or more processors, at least the animation.

Example 2. The computer-implemented method of any of the preceding examples, further comprising: generating at least one synthetic Shapley value by at least performing an interpolation between a first Shapley value of the set of Shapley values and a second Shapley value of the set of Shapley values; and generating an updated set of Shapley values by updating the set of Shapley values to include the at least one synthetic Shapley value, wherein the plurality of frames is generated based on in part on the updated set of Shapley values.

Example 3. The computer-implemented method of any of the preceding examples, further comprising: applying at least the set of Shapley values to an LSTM model configured to predict a model type based on in part on the set of Shapley values.

Example 4. The computer-implemented method of any of the preceding examples, further comprising: normalizing the set of Shapley values before applying the set of Shapley values to the LSTM model.

Example 5. The computer-implemented method of any of the preceding examples, further comprising: identifying a set of LSTM activations from the LSTM model; generating an encoded activations representation by at least applying the set of LSTM activations to an autoencoder; and mapping the encoded activations representation to an embedding space.

Example 6. The computer-implemented method of any of the preceding examples, further comprising: outputting the embedding space.

Example 7. The computer-implemented method of any of the preceding examples, wherein outputting the embedding space comprises: causing rendering of an interface comprising at least a plot representation of the embedding space.

Example 8. The computer-implemented method of any of the preceding examples, wherein the plot representation of the embedding space is configured to receive highlight criteria, the computer-implemented method further comprising: visually distinguishing at least a portion of embedded representation in the embedding space based on in part on the highlight criteria.

Example 9. The computer-implemented method of any of the preceding examples, wherein outputting the animation comprises: causing rendering of an interface comprising at least the animation.

Example 10. The computer-implemented method of any of the preceding examples, wherein the interface further comprises at least one other animation corresponding to a second model of a second model type, wherein the animation is generated based on in part on a second set of Shapley values corresponding to training of the second model.

Example 11. The computer-implemented method of any of the preceding examples, wherein the interface comprises a plurality of animations representing different plot type.

Example 12. The computer-implemented method of any of the proceeding examples, further comprising: training, by one or more processors, at least one model utilizing a plurality of portions of a training data set.

Example 13. A computing apparatus comprising memory and one or more processors communicatively coupled to the memory, the one or more processors configured to: train at least one model utilizing a plurality of portions of a training data set; generate a set of Shapley values corresponding to the at least one model, the set of Shapley values comprising a Shapley value generated at completion of training of the at least one model for each different portion of plurality of portions of the training data set; generate a plurality of frames of an animation based on in part on the set of Shapley values; and output at least the animation.

Example 14. The computing apparatus of any of the preceding examples, wherein the one or more processors are further configured to: generate at least one synthetic Shapley value by at least performing an interpolation between a first Shapley value of the set of Shapley values and a second Shapley value of the set of Shapley values; and generate an updated set of Shapley values by updating the set of Shapley values to include the at least one synthetic Shapley value, wherein the plurality of frames is generated based on in part on the updated set of Shapley values.

Example 15. The computing apparatus of any of the preceding examples, wherein the one or more processors are further configured to: apply at least the set of Shapley values to an LSTM model configured to predict a model type based on in part on the set of Shapley values.

Example 16. The computing apparatus of any of the preceding examples, wherein the one or more processors are further configured to: normalize the set of Shapley values before applying the set of Shapley values to the LSTM model.

Example 17. The computing apparatus of any of the preceding examples, wherein the one or more processors are further configured to: identify a set of LSTM activations from the LSTM model; generate an encoded activations representation by at least applying the set of LSTM activations to an autoencoder; and map the encoded activations representation to an embedding space.

Example 18. The computing apparatus of any of the preceding examples, wherein the computer-coded instructions, the one or more processors are further configured to: output the embedding space.

Example 19. The computing apparatus of any of the preceding examples, wherein to output the embedding space the one or more processors are further configured to: cause rendering of an interface comprising at least a plot representation of the embedding space.

Example 20. The computing apparatus of any of the preceding examples, wherein the plot representation of the embedding space is configured to receive highlight criteria, and wherein the one or more processors are further configured to: visually distinguish at least a portion of embedded representation in the embedding space based on in part on the highlight criteria.

Example 21. One or more non-transitory computer-readable storage media including instructions that, when executed by one or more processors, cause the one or more processors to: train at least one model utilizing a plurality of portions of a training data set; generate a set of Shapley values corresponding to the at least one model, the set of Shapley values comprising a Shapley value generated at completion of training of the at least one model for each different portion of plurality of portions of the training data set; generate a plurality of frames of an animation based on in part on the set of Shapley values; and output at least the animation.

What is claimed is:

1. A computer-implemented method comprising:

receiving, by one or more processors, a defined training data set;

training, by the one or more processors, a machine-learning model based on a first portion of the defined training data set, wherein the first portion comprises a first defined percentage of the defined training data set;

identifying and storing, by the one or more processors, a first Shapley value corresponding to the training of the machine-learning model based on the first portion of the defined training data set;

training, by the one or more processors, the machine-learning model based on a second portion of the defined training data set, wherein the second portion comprises a second defined percentage of the defined training data set;

identifying and storing, by the one or more processors, a second Shapley value corresponding to the training of the machine-learning model based on the second portion of the defined training data set;

generating, by the one or more processors, a frame of an animation based on the first Shapley value and the second Shapley value; and outputting, by the one or more processors, the animation.

2. The computer-implemented method of claim 1, further comprising:

generating a synthetic Shapley value by at least performing an interpolation between the first Shapley value and the second Shapley value, wherein the frame is generated based on the first Shapley value, the second Shapley value, and the synthetic Shapley value.

3. The computer-implemented method of claim 1, further comprising:

applying at least the first Shapley value and the second Shapley value to an LSTM model configured to predict a model type based on the first Shapley value and the second Shapley value.

4. The computer-implemented method of claim 3, further comprising:

normalizing the first Shapley value and the second Shapley value before applying the first Shapley value and the second Shapley value to the LSTM model.

5. The computer-implemented method of claim 3, further comprising:

identifying an LSTM activation from the LSTM model;

generating an encoded activations representation by at least applying the LSTM activation to an autoencoder; and mapping the encoded activations representation to an embedding space.

6. The computer-implemented method of claim 5, further comprising:

outputting the embedding space.

7. The computer-implemented method of claim 6, wherein outputting the embedding space comprises:

causing rendering of an interface comprising at least a plot representation of the embedding space.

8. The computer-implemented method of claim 7, wherein the plot representation of the embedding space is configured to receive highlight criteria, the computer-implemented method further comprising:

visually distinguishing at least a portion of embedded representation in the embedding space based on the highlight criteria.

9. The computer-implemented method of claim 1, wherein outputting the animation comprises:

causing rendering of an interface comprising at least the animation.

10. The computer-implemented method of claim 9, wherein the interface further comprises at least one other animation corresponding to a second machine-learning model of a second model type, wherein the animation is generated based on a second set of Shapley values corresponding to training of the second machine-learning model.

11. The computer-implemented method of claim 9, wherein the interface comprises a plurality of animations representing different plot types.

12. The computer-implemented method of claim 1, wherein the first defined percentage is five percent and the second defined percentage is ten percent.

13. A system comprising:

one or more processors; and one or more memories storing processor-executable instructions that, when executed by the one or more processors, cause the one or more processors to perform operations comprising:

receiving a defined training data set;

training a machine-learning model based on a first portion of the defined training data set, wherein the first portion comprises a first defined percentage of the defined training data set;

identifying and storing a first Shapley value corresponding to the training of the machine-learning model based on the first portion of the defined training data set;

training the machine-learning model based on a second portion of the defined training data set, wherein the second portion comprises a second defined percentage of the defined training data set;

identifying and storing a second Shapley value corresponding to the training of the machine-learning model based on the second portion of the defined training data set;

generating a frame of an animation based on the first Shapley value and the second Shapley value; and outputting the animation.

14. The system of claim 13, wherein the operations further comprise:

generating a synthetic Shapley value by at least performing an interpolation between the first Shapley value and the second Shapley value, wherein the frame is generated based on the first Shapley value, the second Shapley value, and the synthetic Shapley value.

15. The system of claim 13, wherein the operations further comprise:

applying at least the first Shapley value and the second Shapley value to an LSTM model configured to predict a model type based on the first Shapley value and the second Shapley value.

16. The system of claim 15, wherein the operations further comprise:

normalizing the first Shapley value and the second Shapley value before applying the first Shapley value and the second Shapley value to the LSTM model.

17. The system of claim 15, wherein the operations further comprise:

identifying an LSTM activation from the LSTM model;

generating an encoded activations representation by at least applying the LSTM activation to an autoencoder; and mapping the encoded activations representation to an embedding space.

18. The system of claim 17, wherein the operations further comprise:

outputting the embedding space.

19. The system of claim 18, wherein outputting the embedding space comprises:

causing rendering of an interface comprising at least a plot representation of the embedding space.

20. One or more non-transitory computer-readable media storing processor-executable instructions that, when executed by one or more processors, cause the one or more processors to perform operations comprising:

receiving a defined training data set;

training a machine-learning model based on a first portion of the defined training data set, wherein the first portion comprises a first defined percentage of the defined training data set;

identifying and storing a first Shapley value corresponding to the training of the machine-learning model based on the first portion of the defined training data set;

training the machine-learning model based on a second portion of the defined training data set, wherein the second portion comprises a second defined percentage of the defined training data set;

identifying and storing a second Shapley value corresponding to the training of the machine-learning model based on the second portion of the defined training data set;

generating a frame of an animation based on the first Shapley value and the second Shapley value; and outputting the animation.

* * * * *